US009394049B1

(12) United States Patent
Nourollah

(10) Patent No.: US 9,394,049 B1
(45) Date of Patent: Jul. 19, 2016

(54) PROPULSION DEVICE

(71) Applicant: Mahmoud Nourollah, Oshkosh, WI (US)

(72) Inventor: Mahmoud Nourollah, Oshkosh, WI (US)

(*) Notice: Subject to any disclaimer, the term of this patent is extended or adjusted under 35 U.S.C. 154(b) by 426 days.

(21) Appl. No.: 14/499,097

(22) Filed: Sep. 27, 2014

Related U.S. Application Data

(63) Continuation-in-part of application No. 13/661,137, filed on Oct. 26, 2012, now abandoned.

(51) Int. Cl.
*B64C 11/00* (2006.01)
*B64C 39/00* (2006.01)
*B64C 39/02* (2006.01)
*F01D 23/00* (2006.01)
*B63H 1/04* (2006.01)

(52) U.S. Cl.
CPC ............... *B64C 39/003* (2013.01); *B63H 1/04* (2013.01); *B64C 11/00* (2013.01); *B64C 39/026* (2013.01); *F01D 23/00* (2013.01)

(58) Field of Classification Search
CPC .... B64C 11/00; B64C 11/006; B64C 39/003; B64C 39/005; B64C 39/006; B64C 39/008; B64C 39/026; B63H 1/04; B63H 1/06; B63H 1/08; B63H 1/32; A63H 29/00; F01D 23/00
See application file for complete search history.

(56) References Cited

U.S. PATENT DOCUMENTS

| | | | | |
|---|---|---|---|---|
| 493,569 A * | 3/1893 | Toohey | ..................... | B63H 1/32 416/67 |
| 1,284,851 A | 11/1918 | Ashworth | | |
| 1,615,452 A * | 1/1927 | Heden | ................... | B64C 11/006 244/22 |
| 1,656,492 A | 1/1928 | Moineau | | |
| 1,881,673 A * | 10/1932 | Klahn | ................... | B64C 11/006 244/73 R |
| 1,894,057 A | 1/1933 | Rahn | | |
| 1,898,638 A | 2/1933 | Martin | | |
| 2,669,309 A * | 2/1954 | Akre | ........................ | B63H 1/08 416/111 |
| 4,210,299 A | 7/1980 | Chabonat | | |
| 5,100,080 A | 3/1992 | Servanty | | |
| 7,762,776 B2 | 7/2010 | Siegel | | |
| 2004/0011921 A1 | 1/2004 | Gorshkov | | |
| 2006/0151664 A1* | 7/2006 | Yu | .......................... | B63H 13/00 244/4 R |
| 2008/0078860 A1* | 4/2008 | Createman | ............. | B64C 11/00 244/22 |
| 2014/0219784 A1* | 8/2014 | Nourollah | ............. | B64C 39/008 415/122.1 |

FOREIGN PATENT DOCUMENTS

| | | |
|---|---|---|
| CA | 2214332 | 4/1999 |
| DE | 19529700 | 2/1997 |
| DE | 10107515 | 9/2002 |
| FR | 2677952 | 12/1992 |
| GB | 2325203 | 11/1998 |

* cited by examiner

*Primary Examiner* — Joseph W Sanderson
(74) *Attorney, Agent, or Firm* — Donald J. Ersler

(57) ABSTRACT

A propulsion device preferably includes a wing, a pair of sliding rails, an electric motor, an electrical power source, a pair of connecting rod supports and a pair of connecting rods. Each wing includes two lengthwise members, two cross rods, an outer layer and four roller bearings. Each sliding rail includes a lengthwise track formed on an inner surface thereof. Each end of a cross plate is attached to one of the pair of sliding rails. The electric motor is attached to the cross plate. The electrical power source is connected to the electric motor. The electrical power source is preferably secured to one of the pair of sliding rails. One end of connecting rod support is attached to one of the pair of sliding rails.

18 Claims, 15 Drawing Sheets

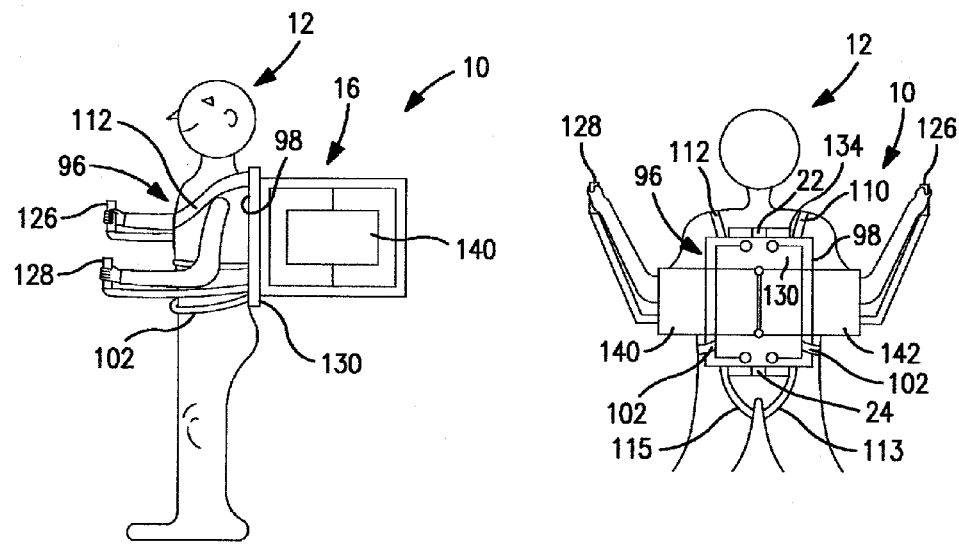
FIG. 1
FIG. 2
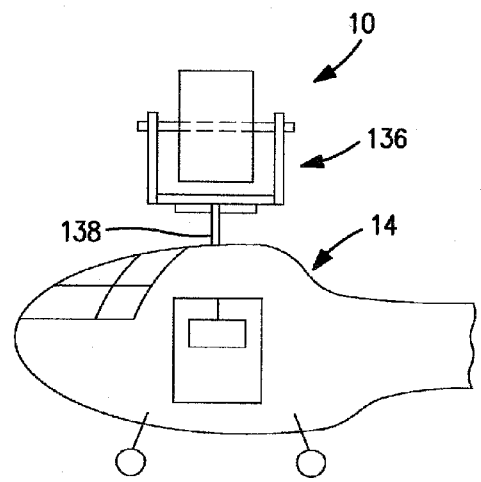
FIG. 3

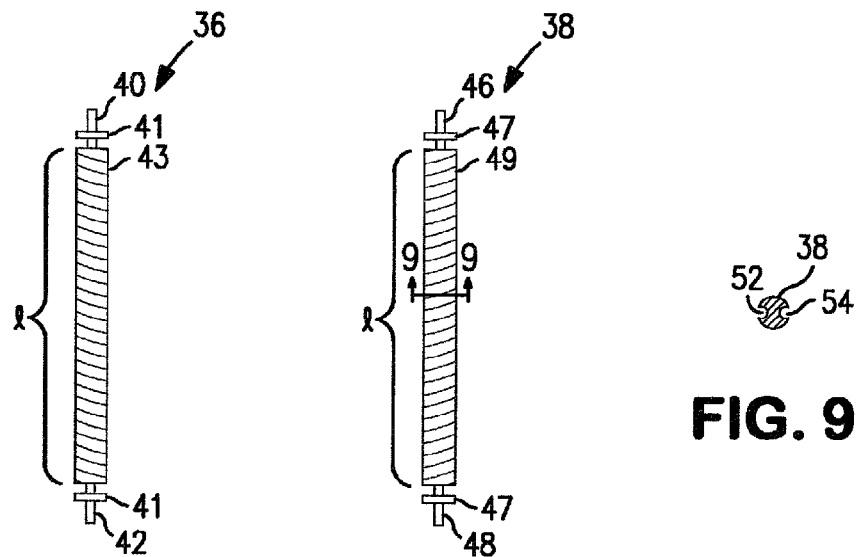
FIG. 7  FIG. 8  FIG. 9
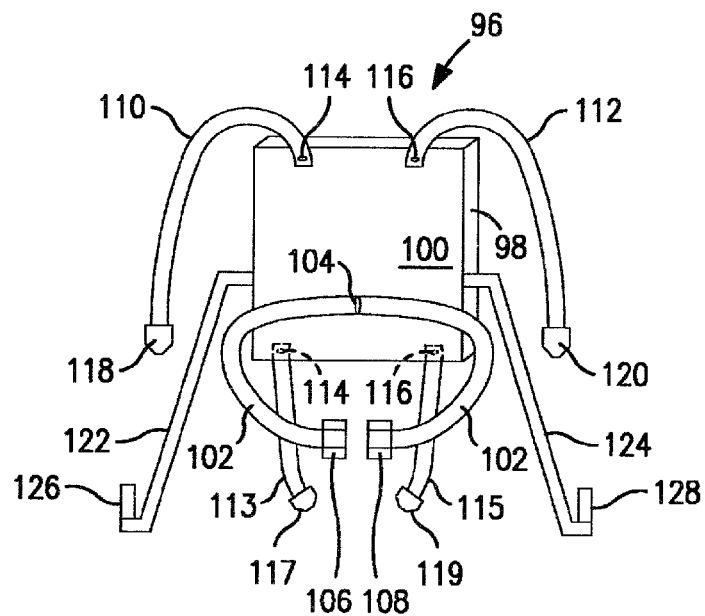
FIG. 10

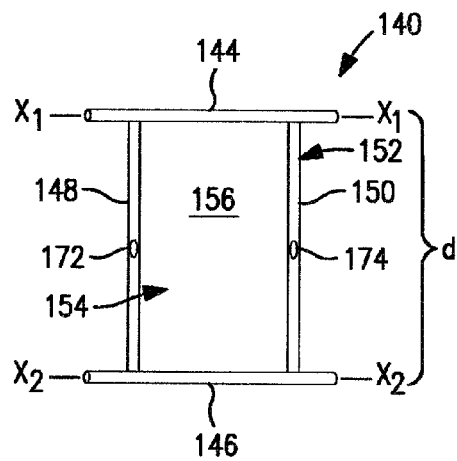
FIG. 11
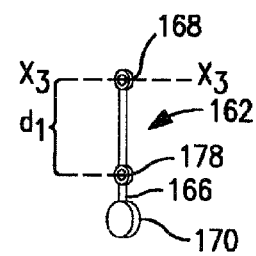
FIG. 12
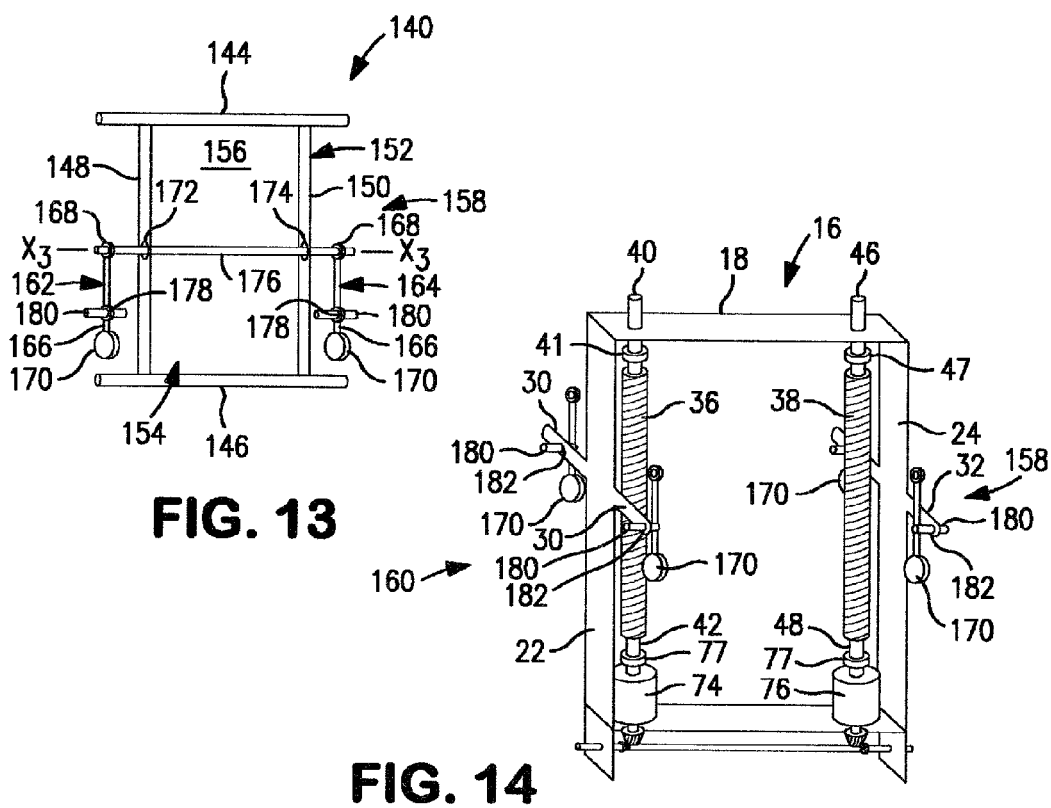
FIG. 13
FIG. 14

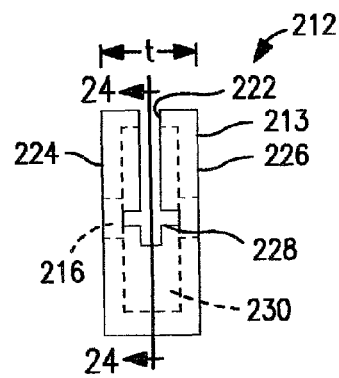
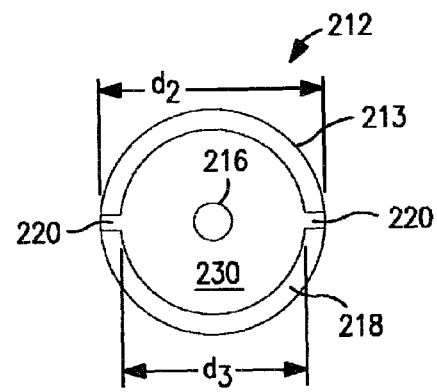
FIG. 23  FIG. 24
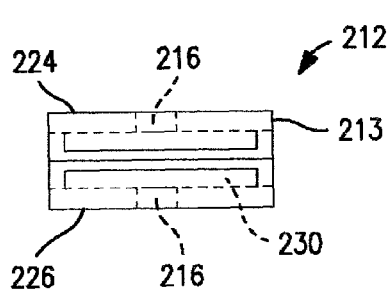
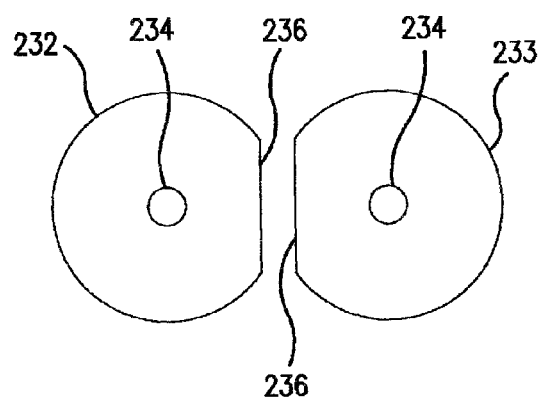
FIG. 25  FIG. 26
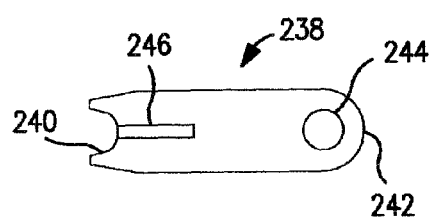
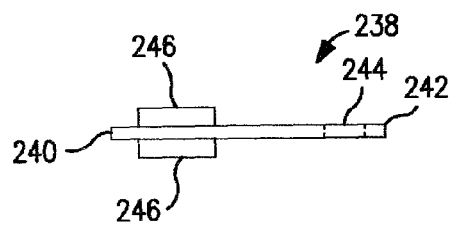
FIG. 27  FIG. 28

PROPULSION DEVICE

CROSS-REFERENCES TO RELATED APPLICATIONS

This is a continuation-in-part patent claiming the benefit of application Ser. No. 13/661,137 filed on Oct. 26, 2012.

BACKGROUND OF THE INVENTION

1. Field of the Invention

This invention relates to a propulsion device, which is capable of lifting and/or propelling a person, an aircraft or an object, such as a helicopter, an airplane or package, through the air.

2. Discussion of the Prior Art

Today, there are numerous vertical take-off and propulsion mechanisms. Some are relatively small and are designed to be strapped onto a person's back while others are larger and can be used to power an aircraft, such as a helicopter or an airplane. A small power pack used to lift a person is sometimes referred to as a jetpack. Jetpacks usually include some kind of motor or engine, which can utilize air velocity or water velocity to lift and propel a person through the air. Some propulsion mechanisms can utilize a power driven shaft with radiating blades, propellers, vanes, wings, etc. placed so as to thrust air or water in a desired direction when spinning to generate sufficient force to lift and propel a person through the air. Some of these devices operate on fossil fuels, such as hydrogen, gasoline, propane or high octane jet fuel, while others rely on electrical batteries. Regardless of the different designs, there is constant effort by engineers to create a more efficient propulsion mechanism.

Accordingly, there is a clearly felt need in the art for a propulsion device, which can generate sufficient lift and mobility to propel a person, aircraft or object, such as a helicopter, an airplane or package, through the air in an efficient and cost effective manner.

SUMMARY OF THE INVENTION

This invention relates to a propulsion device, which is capable of lifting and propelling a person, an aircraft or object, such as a helicopter, an airplane or package, through the air. The propulsion device includes a frame having a pair of support arms secured thereto. The support arms are aligned parallel to one another. A first mechanism is secured to the frame and can provide linear motion to a device interacting therewith. A drive mechanism is connected to the first mechanism and is capable of rotating the first mechanism. The propulsion device also includes a pair of wing assemblies aligned parallel to one another while in an initial orientation. Each wing assembly has a pair of end members and a pair of side members. Each of the pair of side members is secured to the pair of end members to form a structure enclosing a surface area. A wing extends over at least a portion of the surface area.

A counterweight assembly is secured to each of the pair of wing assemblies. Each of the counterweight assemblies has a pair of arms, each with a first end and a second end. Each of the first ends has a weight secured thereto and each of the second ends is rotatably secured to one of the pair of side members, and each of the arms having a point located between the first and second ends which is rotatably attached to one of the support arms. The propulsion device further includes a pair of locking devices secured to each of the pair of end members on each of the pair of wing assemblies. Each pair of the locking devices is positioned outboard of the pair of side members of each of said pair of wing assemblies. The locking devices temporarily engage the first mechanism and are capable of being moved linearly such that as two pairs of the locking devices separate from the first mechanism, each of the pair of wing assemblies will be free to rotate relative to its counterweight assembly. After a set number of degrees of rotation of each of the pair of wing assemblies, the two pairs of locking devices will again engage the first mechanism. Continuation of such action by the pair of wing assemblies will generate lift.

A second embodiment of the propulsion device includes a wing, a pair of sliding rails, an electric motor, an electrical power source, a pair of connecting rod supports and a pair of connecting rods. Each wing preferably includes two lengthwise members, two cross rods, an outer layer and four roller bearings. One end of the two cross rods are pressed into each end of one of the two lengthwise members. The other end of the two cross rods are pressed into each end of the other one of the two lengthwise members. The four roller bearings are pressed on to each end of the two cross rods. The outer layer is secured around the two lengthwise members and the two cross rods. Each sliding rail includes a lengthwise track formed on in an inner surface thereof. An entrance and exit of the lengthwise track is curved to receive the four roller bearings. Each end of a cross plate is preferably attached to one of the pair of sliding rails. The electric motor is attached to the cross plate. The electrical power source is connected to the electric motor. The electric motor includes a pair of opposing drive shafts. A drive pulley is secured to each drive shaft. One end of connecting rod support is attached to one of the pair of sliding rails and a rotating drive pin is retained in the other end of the connecting rod support. A driven pulley is secured to one end of the rotating drive pin. A drive belt is attached to the drive pulley and the driven pulley. The other end of the rotating drive pin is pressed into a middle of the connecting rod. A counter weight is attached to one end of the connecting rod and a wing pivot pin extends inward from the other end of the connecting rod. The wing pivot pin is rotatably retained in a middle of one of the lengthwise members.

In use, the wing may start in any angular position. At least two of the four roller bearings are always engaged in the lengthwise track of the pair of sliding rails. All four roller bearings are engaged with the pair of sliding rails, when the wing is in a vertical position. Rotation of the pair of connecting rods causes the wing to rotate in a substantially elliptical orbit. The motion of the two wings will provide sufficient lift to elevate the item secured to the object platform and transport thereof from one location to another location.

A general object of this invention is to provide a propulsion device, which is capable to lifting and/or propelling a person through the air.

A more specific object of this invention is to provide a propulsion device, which is capable of lifting and propelling an aircraft, such as a helicopter or an airplane, through the air.

Another object of this invention is to provide a propulsion device, which can be operated by a gasoline engine, an electric motor or by manual pedal power.

A further object of this invention is to provide a propulsion device which is relatively simply in construction.

Still another object of this invention is to provide a propulsion device, which is inexpensive to manufacture.

Still further, an object of this invention is to provide a propulsion device, which can utilize various size wing assemblies and which can vary the rotational speed of the wing assemblies.

Other objects and advantages of the present invention will become more apparent to those skilled in the art in view of the following description and the accompanying drawings.

BRIEF DESCRIPTION OF THE DRAWINGS

FIG. 1 is a left side view of a person wearing a propulsion device.

FIG. 2 is a rear view the propulsion device shown in FIG. 1 being strapped onto the back of a person.

FIG. 3 is a side view of a helicopter having a support mechanism for securing said propulsion device thereto.

FIG. 7 is a front view of a worm having a right hand spiral.

FIG. 8 is a front view of a worm having a left hand spiral.

FIG. 9 is a cross-sectional view of the worm shown in FIG. 8 taken along line 9-9.

FIG. 10 is a front view of an attachment mechanism for securing the propulsion device onto the back of a person.

FIG. 11 is a front view of a wing.

FIG. 12 is a perspective view of a counterweight.

FIG. 13 is a front view of a wing having a pair of counterweights pivotally attached thereto.

FIG. 14 is a perspective view of the frame showing attachment of four counterweights.

FIG. 23 is an end view of an alternative locking device.

FIG. 24 is a cross-sectional view of the locking device shown in FIG. 23 taken along line 24-24.

FIG. 25 is a front view of the locking device shown in FIG. 23.

FIG. 26 is a top view of a pair of magnets.

FIG. 27 is a top view of a hook.

FIG. 28 is a side view of the hook shown in FIG. 27.

DETAILED DESCRIPTION OF THE PREFERRED EMBODIMENTS

Referring to FIGS. 1-3, a propulsion device 10 is shown which is capable of lifting and/or propelling an object through the air. The object can be any natural or manmade material thing. The object can be an article or assembly, a person, an animal, a toy, an aircraft, such as a helicopter or an airplane, a pilotless remote-controlled aircraft, a drone, etc. In FIGS. 1 and 2, a person 12 is depicted as the object. In FIG. 3, a helicopter 14 is depicted as the object. Desirably, the propulsion device 10 will provide both lift and propulsion to an object so that it can move through the air in a predetermined direction and at a desired speed.

Figure 4:
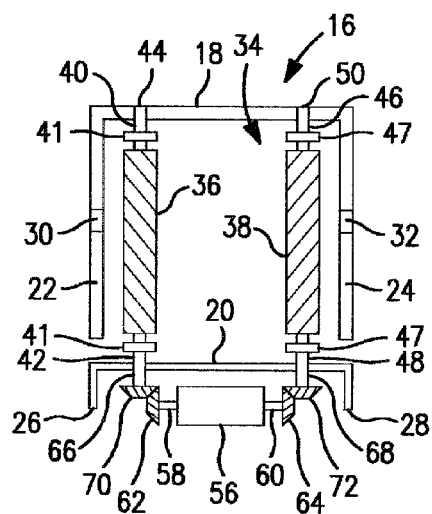
FIG. 4 is a front view of a frame of the propulsion device shown in FIG. 1 and showing a drive mechanism connected to the frame.
Figure 5:
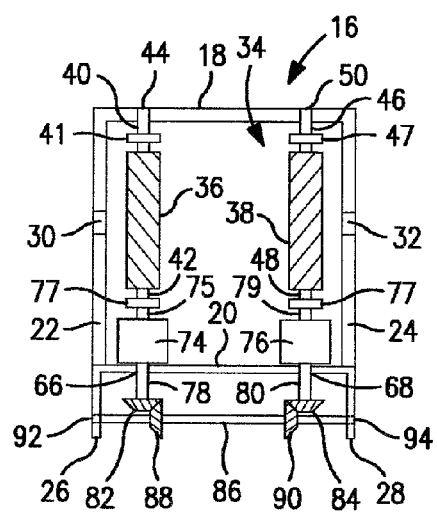
FIG. 5 is a front view of a frame of the propulsion device shown in FIG. 1 and showing a pair of motors connected to the frame.
Figure 6:
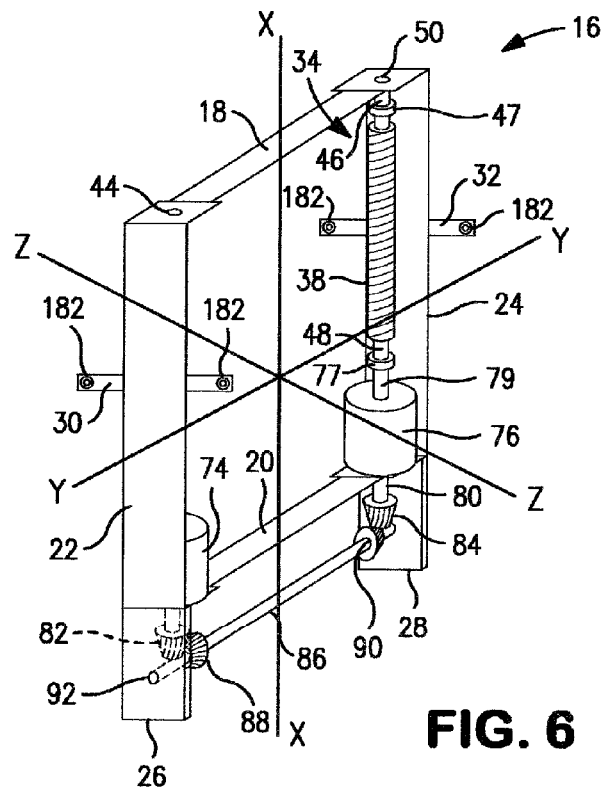
FIG. 6 is a perspective view of frame shown in FIG. 5 depicting a pair of straps directly attached to the frame for releasably attaching said propulsion device to a person.

Referring to FIGS. 4-6, the propulsion device 10 includes a frame 16. The frame 16 can be formed to have any desired geometrical shape or configuration. As depicted, the frame 16 has a rectangular shape. However, the frame 16 could be formed in the shape of a square, a triangle, a circle, a semi-circle, an oval, an irregular shape, etc. Furthermore, the frame 16 can also have a partially open configuration or contain one or more open ends. The structural members forming the frame 16 can also vary in size, shape, cross-section, etc. The structural members can have a circular, square, rectangular, L-shaped, etc. cross-section. Such structural members can be solid or hollow, such as a solid circular bar or a hollow tube. The materials from which the frame 16 can be constructed can also vary. The materials can include but are limited to: ferrous and non-ferrous metals, metal alloys, aluminum, aluminum alloys, titanium, nickel, copper, thermoplastics, plastic, composites, fiberglass, etc. or a combination of one or more different materials. Those skilled in the aviation arts are aware of many specialty materials that could be used to construct the frame 16. As depicted in FIGS. 4-6, the frame 16 includes a top member 18 and a bottom member 20. The top and bottom members, 18 and 20 respectively, are joined and/or secured to a pair of vertical side members, 22 and 24. The side members 22 and 24 are spaced apart from one another. Each of the side members 22 and 24 has a lower end, 26 and 28 respectively. The bottom member 20 is shown being secured inward or away from these lower ends 26 and 28. However, the bottom member 20 can be secured to the lower ends 26 and 28, if desired.

FIGS. 4-6 represent one configuration of the frame 16. However, it should be understood that the frame 16 can be constructed in an infinite variety of ways. The orientation of the frame 16 is being described solely for the purpose of understanding the drawings. One skilled in the art will realize that the frame 16 can be reoriented to any desired position.

Referring to FIG. 6, the frame 16 is shown having a longitudinal axis X-X, a vertical axis Y-Y and a transverse axis Z-Z. The frame 16 has a pair of support arms 30 and 32, each being secured to one of the pair of side members 22 and 24. The support arms 30 and 32 are aligned parallel to one another and are arranged at the same height along the X-X axis, are spaced apart from one another along the Y-Y axis, and are positioned at an identical location along the Z-Z axis. In other words, the support arms 30 and 32 represent a spaced apart mirror image of one another within the frame 16. Each of the support arms 30 and 32 can be a single member secured across one of the vertical side members 22 and 24. Alternatively, each of the support members 30 and 32 can consist of two separate members each being secured to a side of one of the side members 22 and 24. The function of the support members 22 and 24 will be discussed later.

Referring now to FIGS. 4-9, the propulsion device 10 also includes a first mechanism 34 secured to the frame 16. The first mechanism 34 is designed to provide linear motion to a device interacting therewith. The first mechanism 34 can vary in configuration, components and functionality. As depicted, the first mechanism 34 is represented by a pair of rotatable worms 36 and 38. By a "worm" it is meant a spirally threaded shaft. As best shown in FIGS. 7 and 8, the worm 36 has a left hand turning spiral and the worm 38 has a right hand turning spiral. With a left hand turning spiral, as the worm 36 is rotated clockwise, a device engaging the spiral will move upward. Likewise, with a right hand turning spiral, as the worm 38 is rotated counterclockwise, a device engaging the spiral will move upward. The spirals formed on the worms 36 and 38 can be reversed, if desired.

Referring to FIG. 7, the worm 36 has a first end 40, a second end 42, and an elongated cylindrical portion 43 having an outer periphery. The elongated cylindrical portion 43 is located between the first and second ends 40 and 42 respectively. The elongated cylindrical portion 43 has a length 1 and a predetermined outer diameter. A pair of abutments 41, 41 is formed on the worm 36. Each of the abutments 41, 41 is located adjacent to one of the first and second ends, 40 and 42 respectively. The function of the pair of abutments 41, 41 will be explained shortly. The first end 40 is sized and configured to engage an aperture 44 formed in the top member 18 of the frame 16, see FIG. 6. A bearing, not shown, can be positioned in the aperture 44 to permit the first end 40 of the worm 36 to turn freely. By a "bearing" it is meant a device that supports, guides, and reduces the friction of motion between fixed and moving machine parts.

Referring to FIG. 8, the worm 38 has a first end 46, a second end 48, and an elongated cylindrical portion 49 having an outer periphery. The elongated cylindrical portion 49 is located between the first and second ends 46 and 48 respectively. The elongated cylindrical portion 49 has a length 1 and a predetermined outer diameter. A pair of abutments 47, 47 is formed on the worm 38. Each of the abutments 47, 47 is located adjacent to one of the first and second ends, 46 and 48 respectively. The function of the pair of abutments 47, 47 will be explained shortly. Desirably, the length 1 of the elongated cylindrical portion 49 is equal to the length of the elongated cylindrical portion 43. Likewise, the outer diameter of the elongated cylindrical portion 49 is equal to the outer diameter of the elongated cylindrical portion 43. The first end 46 is sized and configured to engage an aperture 50 formed in the top member 18 of the frame 16, see FIG. 6. A bearing, not shown, can be positioned in the aperture 50 to permit the first end 46 of the worm 38 to turn freely. The overall length of each of the pair of worms 36 and 38 can also be the same.

Referring to FIG. 9, a cross-section of the worm 38 is shown taken along line 9-9. The cross-section of each of the pair of worms 36 and 38 is identical except for the fact that one has a right hand turning spiral and the other has a left hand turning spiral. The cross-section reveals a pair of spaced apart circular grooves 52 and 54. The diameter of each of the pair of circular grooves 52 and 54 is the same. Each of the pair of circular grooves 52 and 54 is spirally formed throughout the length 1 of the elongated cylindrical portions 43 and 49 of the pair of worms 36 and 38. In other words, each of the grooves 52 and 54 spirally wind throughout the elongated cylindrical portion 49 of the worm 38. The pair of grooves 52 and 54 intersect the outer periphery of the worm 38 to form a pair of openings therewith. In other words, the openings expose a portion of each of the grooves 52 and 54 when one is looking at the outside of the worm 38. The same is true with the pair of grooves 52 and 54 formed in the worm 36. The exact configuration of the pair of grooves 52 and 54 can vary. Desirably, each of the pair of grooves 52 and 54 has a spherical configuration. The purpose of the pair of grooves 52 and 54 will be explained shortly.

Referring again to FIG. 4, the propulsion device 10 further includes a drive mechanism 56. The drive mechanism 56 is mechanically connected to the first mechanism 34 by one or more shafts, gears, collars, etc. and is capable of actuating the first mechanism 34. Desirably, the drive mechanism 56 will rotate the first mechanism 34. The drive mechanism 56 can be a motor or an engine that can convert energy into mechanical force or motion. The drive mechanism 56 can be any kind or type of motor or engine. The drive mechanism 56 can be an electric motor, a gasoline engine, a hydraulic motor, a pneumatic motor, etc. For example, the drive mechanism 56 can be an internal combustion engine. The drive mechanism 56 can also consist of two or more motors or engines. In FIG. 4, the drive mechanism 56 is a single motor. In FIGS. 5 and 6, the drive mechanism 56 includes two motors.

The drive mechanism 56 can also be a mechanical device, such as a pair of pedals attached to a sprocket which in turn is mechanically connected to the first mechanism 34. By rotating the pedals, using one's feet or hands, one is able to rotate the first mechanism 34.

In FIG. 4, the drive mechanism 56 is a motor having a pair of rotatable output shafts 58 and 60 each having a gear 62 and 64 secured thereto. Desirably, the gears 62 and 64 are bevel gears. By a "bevel gear" it is meant either of a pair of gears with teeth surfaces cut so that they can connect unparallel gear shafts. The second ends 42 and 48 of the worms 36 and 38 pass through a pair of apertures formed in the bottom member 20. A bevel gear 70 is secured to the end 42 of the worm 36 and engages with the bevel gear 62. Likewise, a bevel gear 72 is secured to the end 48 of the worm 38 and engages with the bevel gear 64. This arrangement allows the worms 36 and 38 to synchronously rotate in unison. The pair of worms 36 and 38 will rotate in opposite directions from one another. The worm 36 can be made to rotate counter clockwise while the worm 38 rotates clockwise, or vice versa.

Referring again to FIGS. 5 and 6, an alternative arrangement for the drive mechanism 56 is depicted. In this arrangement, the drive mechanism 56 is shown having two motors or engines 74 and 76. The motor 74 has a first rotatable output shaft 75 which is connected to the second end 42 of the worm 36 by a collar 77. The collar 77 can also serve the same function as the abutment 47 and therefore the abutment 47 on the lower end of the worm 36 is not needed. The motor 74 has a second rotatable output shaft 78 which passes through the aperture 66 formed through the bottom member 20 of the frame 16. A bevel gear 82 is secured to the second output shaft 78. Likewise, the motor 76 has a first rotatable output shaft 79 which is connected to the second end 46 of the worm 38 by a collar 77. As stated above, the collar 77 can also serve the same function as the abutment 47 and therefore the abutment on the lower end of the worm 38 is not needed. The motor 76 has a second rotatable output shaft 80, which passes through the aperture 68 formed through the bottom member 20 of the frame 16. A bevel gear 84 is secured to the second output shaft 80. A rotatable connecting shaft 86 having a pair of bevel gears 88 and 90 secured thereto has a pair of ends which pass into apertures 92 and 94 formed in the lower ends 26 and 28 of the side members, 22 and 24 respectively. The bevel gears 88 and 90 engage with the bevel gears 82 and 84 which are secured to the second output shafts 78 and 80 extending out of the motors 74 and 76. The connecting shaft 86 assures that the pair of worms 36 and 38 will synchronously rotate together while they rotate in opposite directions due to the engagement of the bevel gear 82 with bevel gear 88 and the engagement of bevel gear 84 with bevel gear 90.

Referring now to FIGS. 1, 2 and 10, an attachment mechanism 96 is shown which is capable of securing the propulsion device 10 to the back of a person. The attachment mechanism 96 can vary in design, construction and configuration. The attachment mechanism 96 is separate and distinct from the propulsion device 10 but includes a mechanism for releasably or permanently securing the propulsion device 10 to it. The attachment mechanism 96 includes a frame 98 having a first surface 100 which can be positioned adjacent to the back of a person 12 who will carry the propulsion device 10. The frame 98 can be constructed out of lightweight materials. The frame 98 can have an open structure, such as a rim or surrounding members, or it could be a solid member. Another option is to construct the frame 98 with one or more openings formed therein, such that it has a screen like pattern. A waist strap 102 is secured approximate its midpoint 104 to the first surface 100. The waist strap 102 can be a formed as a single member or be formed as two separate members. The waist strap 102 is depicted as a single member in FIG. 10 which is secured approximate its midpoint 104 to the frame 98. A pair of buckles 106 and 108, designed to mate with one another, is secured to distal ends of the waist strap 102. The pair of buckles 106 and 108 is designed to be releasably connected to one another to secure the waist strap 102 around the waist or abdomen a person 12. The buckles 106 and 108 can be mounted onto the waist strap 102 in such a fashion that the waist strap 102 can be adjusted lengthwise to insure that the waist strap 102 snugly surrounds the wearer's waist.

The attachment mechanism 96 also includes a pair of shoulder straps 110 and 112 secured to the first surface 100 by securement devices 114 and 116. The securement devices 114 and 116 can vary in construction and design. For example, each of the securement devices 114 and 116 can be a mechanical fastener, such as a bolt, a screw, etc. A pair of buckles 118 and 120 is formed on the distal ends of each of the pair of shoulder straps, 110 and 112 respectively. The buckles 118 and 120 can engage with the pair of waist buckles 106 and 108 to hold the attachment mechanism 96 secure to the person's 12 back. Alternatively, the pair of shoulder straps 110 and 112 can be secured to a lower portion of the frame 98. Those skilled in the art are aware of many different options for securing the buckles 118 and 120 together and to one or more portions of the frame 98.

The attachment mechanism 96 further includes a pair of leg straps 113 and 115 secured to the first surface 110 by securement devices 114 and 116. A pair of buckles 117 and 119 can engage with the pair of waist buckles 106 and 108 to hold the attachment mechanism 96 secure to the person's back.

Still referring to FIGS. 1, 2 and 10, the attachment mechanism 96 can further include a pair of forearm supports 122 and 124. By "forearm" it is meant the part of a human arm located between the wrist and the elbow. Each forearm support 122 and 124 is secured to the frame 98. A pair of hand operated, rotatable grips 126 and 128 can be mounted onto the ends of the pair of forearm supports 122 and 124. The pair of hand operated, rotatable grips 126 and 128 is designed to be grasped by the hands of the person 12 wearing the attachment mechanism 96. The pair of hand operated, rotatable grips 126 and 128 is functionally connected to the propulsion device 10. The rotatable grips 126 and 128 can be connected mechanically, electrically or by both mechanical and electrical connections so that the propulsion device 10 can be easily controlled and operated by the person 12 wearing the attachment mechanism 96. By "operate" it is meant that the person 12 can turn the propulsion device 10 on, adjust the speed of the drive mechanism 56, change the orientation of the propulsion device 10 relative to the ground, and turn the propulsion device 10 off. Those skilled in the art of jetpacks will be aware of alternative ways to construct the attachment mechanism 96.

Referring again to FIG. 2, the frame 98 of the attachment mechanism 96 also has a second surface 130. The second surface 130 faces away from the back of the person 12 wearing the attachment mechanism 96. The second surface 130 includes a pair of spaced apart brackets 132 and 134, which is constructed and design to engage with a portion of the frame 16 of the propulsion device 10. For example, the top or bottom members, 18 or 20 respectively, of the propulsion device 10 can be inserted into the pair of brackets 132 and 134. The pair of brackets 132 and 134 can be designed to include a release mechanism, not shown, which can be activated when the person is standing on the ground and wishes to separate the propulsion device 10 from the attachment mechanism 96.

Referring again to FIG. 3, the propulsion device 10 is shown secured to an alternatively designed attachment mechanism 136. The attachment mechanism 136 is designed to be permanently secured to an upper surface 138 of a helicopter 14. Those skilled in the art will know of various ways to construct and design such an attachment mechanism 136.

Referring now to FIGS. 2 and 11-13, the propulsion device 10 further includes a pair of wing assemblies 140 and 142 aligned parallel to one another while in an initial orientation. Each wing assembly 140 and 142 is identical in construction and size. The wing assembly 140 is depicted in FIG. 11. The wing assembly 140 has a pair of end members 144 and 146 and a pair of side members 148 and 150. Each of the pair of side members 148 and 150 is secured or fastened to the pair of end members 144 and 146 to form a structure 152 enclosing a surface area 154 therein. The shape of the structure 152 can vary as well as the way the members are secured or fastened together. In FIG. 11, the structure 152 is depicted as a rectangle, which encloses a rectangular shaped surface area 154. A wing 156 extends over and occupies at least a portion of the surface area 154. Desirably, the wing 156 extends over and occupies from between about 50% to about 100% of the surface area 154. More desirably, the wing 156 extends over and occupies at least about 85% of the surface area 154. Even more desirably, the wing 156 extends over and occupies at least about 90% of the surface area 154. Most desirably, the wing 156 extends over and occupies at least about 95% of the surface area 154. It should be understood that the wing 156 could extend over and occupy 100% of the surface area 154, if desired.

The wing 156 can be formed from a variety of materials. The wing 156 should be formed from a wind resistance material. Desirably, the wing 156 is formed from a thin lightweight material, which is durable. The wing 156 can be a cloth material, a fabric, such as cotton, nylon, polyester, etc. Alternatively, the wing 156 can be made from a flexible film, a thermoplastic, a plastic, a composite material, fiberglass, from a thin metal or metal alloy, from aluminum, an aluminum alloy, etc. Those skilled in the art are aware of many special materials that can be used to construct wings.

Referring to FIGS. 2, 11-13, each of the pair of wing assemblies 140 and 142 also includes a counterweight assembly 158 and 160. Each of the counterweight assemblies 158 and 160 is identical in construction. The counterweight assembly 158 is shown in FIG. 13. Each counterweight assembly 158 and 160 includes a pair of arms 162, 164. The arm 162 is identical in construction and dimension to the arm 164. Each arm 162 and 164 has a first end 166 and a spaced apart second end 168. A weight 170 is secured to each of the first ends 166. The actual amount of the weight 170 can vary depending on the weight of the wing 156, as well as other factors in the propulsion device 10. The second end 168 of each of the pair of arms 162 and 164 is rotatably secured to one of the pair of side members 148 and 150 of the pair of wing assemblies, 140 and 142 respectively. In FIGS. 11 and 13, this is accomplished by forming an aperture 172 through the side member 148 and forming an aperture 174 through the side member 150. The apertures 172 and 174 should be horizontally aligned. Desirably, each of the apertures 172 and 174 will be located approximately at a midpoint along each of the side members 148 and 150. A bearing, not shown, can be positioned in each of the apertures 148 and 150.

A connecting rod 176 can be inserted through both of the apertures 172 and 174. The connecting rod 176 should have sufficient length to extend outward beyond the two side members 148 and 150. The second end 168 of each of the pair of arms 162 and 164 is secured to the ends of the connecting rod 176 such that as the connecting rod 176 turns or rotates in the apertures 172 and 174, the pair of arms 162 and 164 will likewise rotate. Desirably, the pair of arms 162 and 164 are aligned perpendicular or at 90 degrees to the connecting rod 176.

The counterweight assemblies 158 and 160 are designed to rotate through a circular arc of 360 degrees.

Referring to FIGS. 11-13, the end member 144 has a longitudinal central axis $X_1$-$X_1$ and the end member 146 has a longitudinal central axis $X_2$-$X_2$, see FIG. 11. The distance measured between these two longitudinal central axes $X_1$-$X_1$ and $X_2$-$X_2$ is designated d. The distance d can vary. Referring to FIG. 12, each of the arms 162 and 164 of the counterweight assemblies 158 and 160 has an aperture 178 located between the first and second ends, 166 and 168 respectively. The aperture 178 has a circular internal periphery. The location of the aperture 178 is very important. In FIG. 13, the connecting rod 176 has a longitudinal central axis $X_3$-$X_3$. The distance measured between the longitudinal central axis $X_3$-$X_3$ and the center of the aperture 178 is equal to d/4. Stated another way, each of the pair of end members 144 and 146 has a longitudinal central axis, $X_1$-$X_1$ and $X_2$-$X_2$ respectively, and the distance d measured between these longitudinal axes $X_1$-$X_1$ and $X_2$-$X_2$ is four times the distance measured between the second end 168 of each of the pair of arms 162 and 164 and the point 178 on each of the pair of arms 162 and 164 which is rotatably attached to one of the support arms 30 or 32. By constructing the counterweight assemblies 158 and 160 in this manner, they will be able to permit the wing assemblies 140 and 142 to rotate smoothly and efficiently in a unique pattern through 360 degrees. The rotational speed of the wing assemblies 140 and 142 can vary. The profile of the unique pattern will depend upon the actual dimensions of the wing assemblies 140 and 142. Such dimensions can vary as well.

Referring now to FIGS. 13 and 14, a pair of connecting shaft 180, 180 pass through the apertures 178, 178 formed in each of the pair of arms 162 and 164. A bearing, not shown, can be positioned in each of the apertures 178, 178 to permit the pair of connecting shafts 180, 180 to turn freely. An outer end of each of the pair of connecting shafts 180, 180 engages with an aperture 182 formed in the support arms 30 and 32. This means that each arm 162 and 164 is rotatably attached to one of the support arms 30 and 32. A bearing, not shown, can be positioned in each of the apertures 182, 182 to permit the pair of connecting shafts 180, 180 to turn freely.

Referring again to FIG. 6, each of the support arms 30 and 32 has a pair of apertures 182, 182 formed in opposite ends thereof. The apertures 182, 182 are horizontally aligned with one another. The pair of apertures 182, 182 formed in each of the support arms 30 and 32 permit the two wing assemblies 140 and 142, with each having a counterweigh assembly, 158 and 160 respectively, to be connected to the frame 16. This arrangement allows each of the wing assemblies 140 and 142 to rotate relative to the frame 16. Desirably, each of the wing assemblies 140 and 142 will rotate in an opposite direction, one rotating clockwise and the other counterclockwise.

Figure 15:
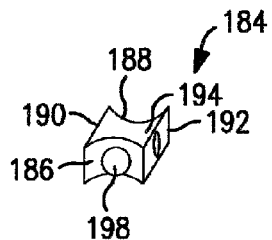
FIG. 15 is a perspective view of a worm lock.
Figure 17:
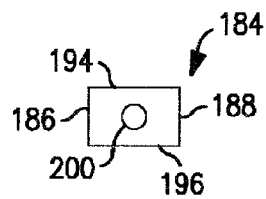
FIG. 17 is a side view of the worm lock shown in FIG. 15.
Figure 16:
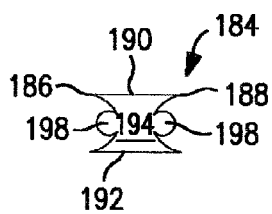
FIG. 16 is a top view of the worm lock shown in FIG. 15.

Referring now to FIGS. 15-17, a locking device 184 is shown which has a first end 186, a second end 188, a first side 190, a second side 192, a top surface 194 and a bottom surface 196. Each of the first and second ends, 186 and 188 respectively, of the locking device 184 has a concave or arcuate shape which is sized and configured to mate with a portion of the outer diameter of one of the pair of worms 36 and 38. Desirably, the concave shape is in the form of a semi-circle. The concave shape can extend over an arc of from between about 135 degrees to about 180 degrees. More desirably, the concave shape can extend over an arc of from between about 160 degrees to about 180 degrees. Even more desirably, the concave shape will extend over an arc of from between about 175 degrees to about 180 degrees. Most desirably, the concave shape will extend over an arc of 180 degrees. The first and second sides, 190 and 192 respectively, of the locking device 184 can be planar or non-planar. The first and second sides, 190 and 192 respectively, can also be aligned parallel to one another or can be tapered relative to one another. Likewise, the top surface 194 and the bottom surface 196 of the locking device 184 can be planar or non-planar. The top surface 194 and the bottom surface 196 can also be aligned parallel to one another or can be tapered relative to one another. An outwardly extending spherical ball 198 is formed, constructed or attached to each of the first and second ends, 186 and 188 respectively, of the locking device 184. Desirably, the locking device 184 is an integral member and the two spherical balls 198, 198 are integrally formed rather than being attached to the remainder of the locking device 184. However, each of the spherical balls 198, 198 can be attached to the first and second ends, 186 and 188 respectively, of the locking device 184, if desired. Each of the spherical balls 198, 198 is sized to engage with one of the pair of circular grooves 52 and 54, see FIG. 9, spirally formed in each of the pair of worms 36 and 38. Desirably, each of the spherical balls 198, 198 is slightly smaller in overall size from each of the pair of circular grooves 52 and 54 to facilitate smooth travel of each of the spherical balls 198, 198 over the length of the grooves 52 and 54, which are formed in each of the pair of worms 36 and 38. Each of the outwardly extending, spherical balls 198, 198 can engage with one of the pair of circular grooves 52 and 54 at the lower or second end 42 or 48 of one of the pair of worms 36 or 38. Once engaged, the spherical ball 198 will be locked into the circular groove 52 or 54 until the spherical ball exits from the opposite or first end 40 or 46 of one of the pair of worms 36 or 38. In this arrangement, a locking device 184 enters or engages with the bottom or second end 42 or 48 of one of the pair of worms 36 or 38 and travels upward to the upper or first end 40 or 46 of one of the pair of worms 36 or 38.

Still referring to FIGS. 15-17, the locking device 184 further includes an aperture 200, which extends therethrough from the first side 190 to the second side 192. The aperture 200 is shown being formed at an equal distance between the top surface 194 and the bottom surface 196. However, the aperture 200 can be offset so as to be closer to the top surface 194, if desired. The aperture 200 is sized and configured to receive one of the end members 144 and 146 of the wing assemblies 140 and 142. Desirably, each of the ends members 144 and 146 has the same cross-sectional size and configuration. More desirably, each of the end members 144 and 146 is an elongated cylindrical member.

Figure 18:
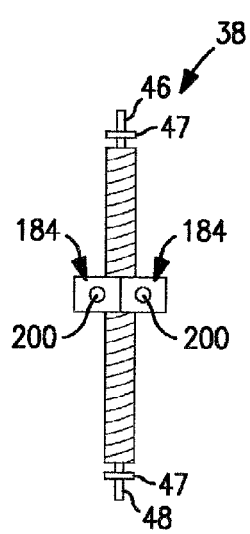
FIG. 18 is a front view of a worm having a pair of worm locks movably attached thereto.
Figure 19:
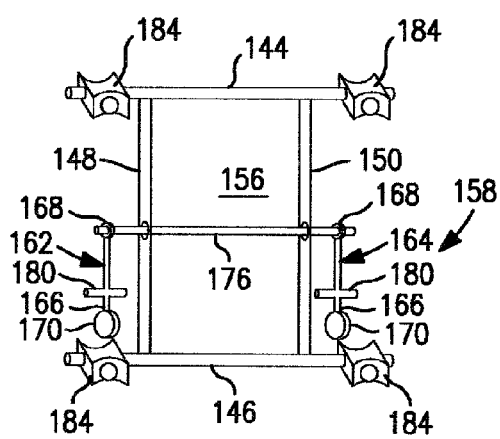
FIG. 19 is a front view of a wing assembly.
Figure 20:
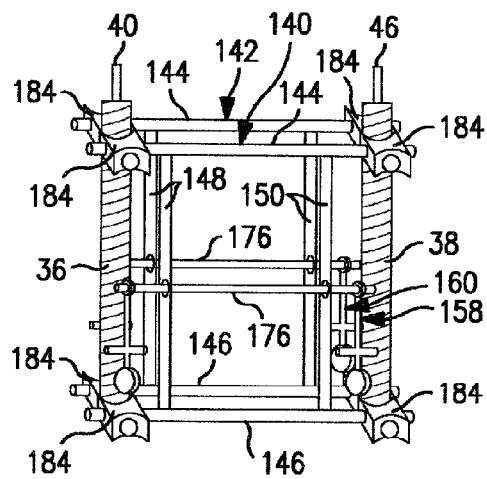
FIG. 20 is a perspective view of a pair of wing assemblies secured to a pair of worms.

Referring to FIGS. 18-20, a pair of locking devices 184, 184 is secured to each of the pair of end members 144 and 146 on each of the pair of wing assemblies 140 and 142. For the two wing assemblies 140 and 142, a total of eight locking devices 184 are needed. Two locking devices 184, 184 will join or connect the left side of the two end members 144, 144 to the worm 36 and two locking devices 184, 184 will join or connect the right side of the two end members 144, 144 to the worm 38. The same number of locking devices 184 is needed to join or connect the two end members 146 to the pair of worms 36 and 38. Each pair of the locking devices 184, 184 is positioned outboard of the pair of side members 148 and 150. Each pair of the locking devices 184, 184 will temporarily engage with the first mechanism 34. When the first mechanism 34 includes a pair of worms 36 and 38, each pair of the locking devices 184, 184 from each of the wing assemblies 140 and 142 will engage one of the worms 36 or 38. Four locking devices 184, 184, 184 and 184 contact the pair of worms 36 and 38 when the propulsion device 10 is in an initial orientation, see FIG. 20.

Since a pair of locking devices 184, 184 is secured to each of the end members 144 and 146, this means that two pairs or four locking devices 184, 184, 184 and 184 are associated with each worm 36 and 38. Each pair of locking devices 184, 184 is capable of being moved linearly over the length of one of the worms 36 and 38. Desirably, this travel is upward from the second ends 42 and 48 of the worms 36 and 38 to the first ends 40 and 46 of the worms 36 and 38. As the upper two pairs of the locking devices 184, 184, 184 and 184, connected to the end member 144, separate or disengage from the first mechanism 34 (the pair of worms 36 and 38), one end of each of the pair of wing assemblies 140 and 142 will be free to rotate relative to its counterweight assemblies 158 or 160. It should be understood that at this time, the end member 146 will remain attached to the pair of worms 36 and 38 and will continue to travel upward as the end member 144 is rotating downward. At all times, one of the end members 144 and 146 will remain connected to the pair of worms 36 and 38 via the four locking devices 184, 184, 184 and 184.

The pair of abutments 41, 41 formed on the worm 36, and the pair of abutments 47, 47 formed on the worm 38 function as guides for the locking devices 184. They assist in aligning each of the locking devices 184, 184 so that they correctly enter the grooves 52 and 54. As stated above, when the pair of collars 77, 77 are present on the lower portion of the worms 36 and 38, they can replace the lower abutments 41 and 47 for they can serve the same function as the abutments. The only requirement is that the pair of collars 77, 77 have the same outer diameter as the abutments 41, 41 and 47, 47.

After a set number of degrees of rotation of each of the pair of wing assemblies 140 and 142, the two pairs of the locking devices 184, 184, 184 and 184 will again engage the first mechanism 34. Desirably, this will occur at 180 degrees of rotation of the wing assemblies 140 and 142. The four locking devices 184, 184, 184 and 184 will engage the lower ends 42 and 48 of the pair of worms 36 and 38. The four locking devices 184, 184, 184 and 184 attached to the end member 144 will then start to travel upward on the pair of worms 36 and 38. Simultaneously, the four locking devices 184, 184, 184 and 184 attached to the end member 146 will be advancing upward on the pair of worms 36 and 38 and will be located above the end member 144. When the end member 146 has traveled the length 1 of the cylindrical portion 43 and 49 of the pair of worm, 36 and 38 respectively, it will separate or disengage from the pair of worms 36 and 38, and this end of the pair of wing assemblies 140 and 142 will be free to rotate relative to its counterweight assemblies 158 or 160. This sequence of upward travel followed by downward rotation continues as long as the drive mechanism 56 rotates the first mechanism 34.

While the wing assemblies 140 and 142 are rotating downward within the frame 16, the end member 146 with its two pairs of locking devices 184, 184, 184 and 184 will be advancing upward through the length 1 of the pair of worms 36 and 38. Once the end member 144 again engages with the cylindrical portions 43 and 49 of the pair of worms 36 and 38, the end member 146 will be positioned above the end member 144. Both pairs of end members 144, 144 and 146, 146 will then continue to travel upward through the length 1 of the cylindrical portions 43 and 49. As each of the end members 146, 146 and their two pairs of the locking devices 184, 184, 184 and 184 separate or disengage from the cylindrical portions 43 and 49 of the pair of worms 36 and 38, the wing assemblies 140 and 142 are again free to rotate downward 180 degrees. The continuous movement of the pair of end members 144, 144 and 146, 146 through the length 1 of the cylindrical portions 43 and 49 of the pair of worms 36 and 38 will cause the wing assemblies 140 and 142 to rotate in a continuous and constant cycle. The wing assemblies 140 and 142 will rotate or spin. One clockwise and the other counterclockwise to generate lift.

Figure 21:
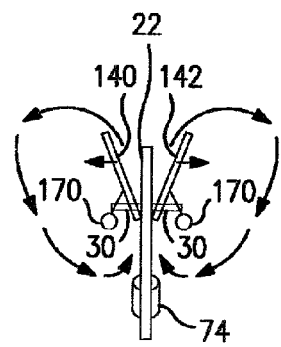
FIG. 21 is a schematic depicting how the two wing assemblies rotate relative to one another.

Referring to FIG. 21, one can see that each cycle or rotation of the wing assemblies 140 and 142 through an arc of 360 degrees produces a unique profile in the shape of a modified oval configuration. This unique profile is partially caused by the fact that one of the end members 144 or 146 is always in contact with the pair of worms 36 and 38. The actual profile will be dictated by the length of each wing 156, the distance d, the length of the cylindrical portions 43 and 49 of the worms 36 and 38, and will as by the length, shape and connecting points of the various members. One can adjust the size of the drive mechanism 56, the size of the wing assemblies 140 and 142, as well as the components of the first mechanism 34, to increase the speed and thrust needed to generate adequate lift and propulsion for the propulsion device 10. The weight, shape and size of the person or aircraft the propulsion device 10 is secured to has to be factored into the calculations in determining the size and makeup of the propulsion device 10.

The propulsion device 10 will generate lift and ascend upward from the ground by increasing the speed or rotation of the wing assemblies 140 and 142. As the speed or rotation of the wing assemblies 140 and 142 decreases, the lift will decrease and the propulsion device 10 will descend back towards the ground. Directional movement in the X and Z directions can be obtained by changing the orientation of the propulsion device 10. When the propulsion device 10 is secured to the back of a person, as is shown in FIGS. 1 and 2, directional movement is obtained by having the person lean his or her torso forward or backward. Left and right direction can be obtained by having the person lean his or her torso to the right or left. When the propulsion device 10 is secured to an aircraft, such as a helicopter, a mechanical mechanism can be employed to change or tilt the orientation of the propulsion device 10.

Figure 22:
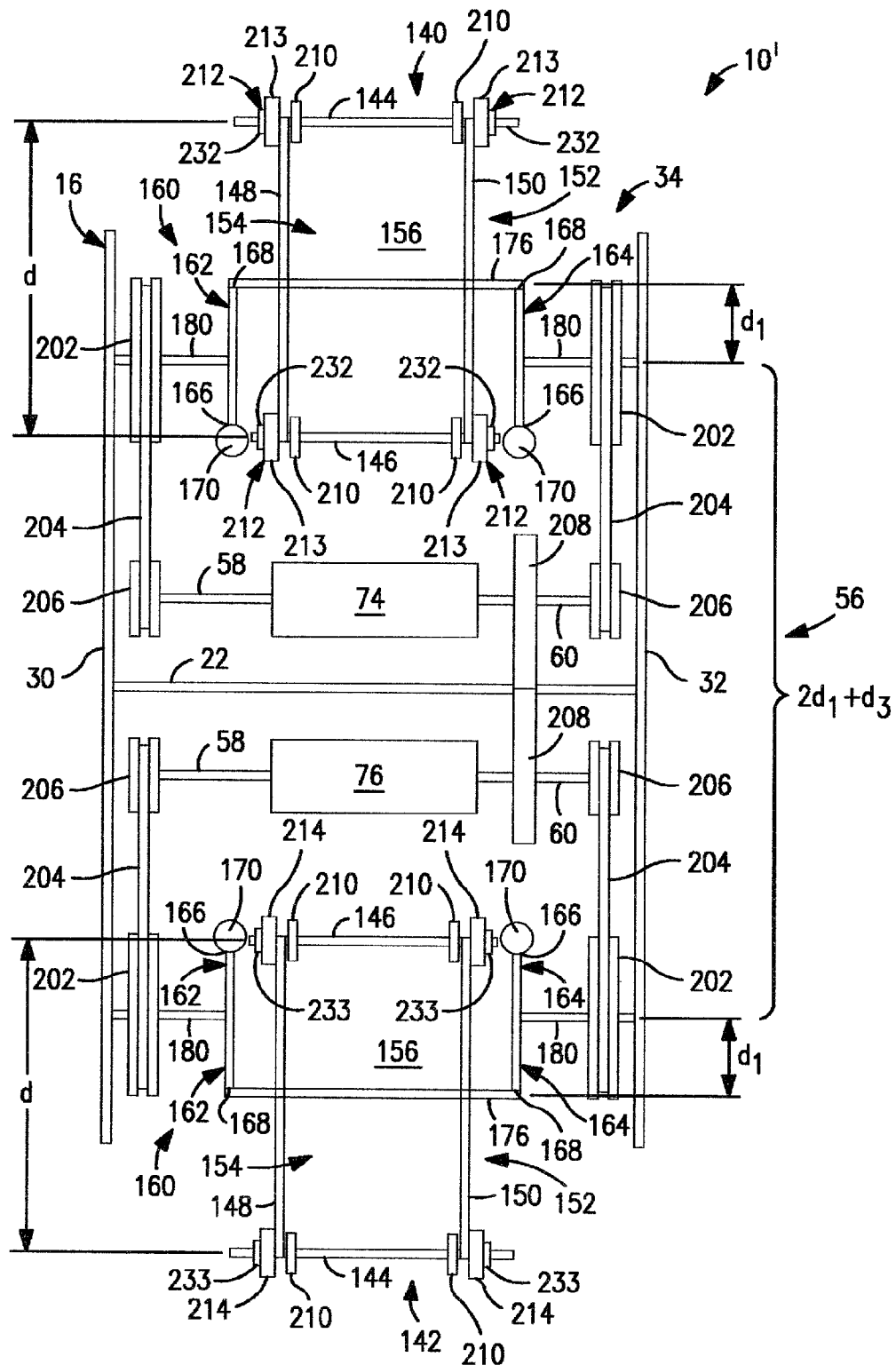
FIG. 22 is a schematic of an alternative propulsion device.

Referring now to FIG. 22, an alternative embodiment of a propulsion device 10' is shown. The propulsion device 10' will be described using similar numbers for the common parts which match those described above for the first embodiment. The propulsion device 10' includes a frame 16 having a side member 22 and a side member 24, only one side member 22 being visible in FIG. 22, and a pair of support arms 30 and 32 secured to the side members 22 and 24 which are aligned parallel to one another. The propulsion device 10' also has a first mechanism 34 secured to the frame 16 which can provide linear motion to a device interacting therewith. The propulsion device 10' further includes a drive mechanism 56 which is capable of rotating the first mechanism 34. The drive mechanism 56 includes a first motor 74 and a second motor 76. The first and second motors, 74 and 76 respectively, can be identical to one another. The first and second motors, 74 and 76 respectively, can be electrical motors, gasoline motors, or any other kind of motors known to those skilled in the art.

The propulsion device 10' also includes a pair of wing assemblies 140 and 142 which are aligned parallel to one another while in an initial orientation. The first motor 74 is mechanically connected to the wing assembly 140 and the second motor 76 is mechanically connected to the wing assembly 142. The first and second motors, 74 and 76 respectively, can rotate the wing assemblies 140 and 142 in either the clockwise or counterclockwise directions. The rotation of the wing assemblies 140 and 142 can be continuous causing the wing assemblies 140 and 142 to rotate through multiple cycles or revolutions. By "cycle" it is meant a rotation through 360 degrees. The wing assembly 140' is identical to the wing assembly 142. Each wing assembly 140 and 142 includes a pair of end members 144 and 146 secured to a pair of side members 148 and 150 to form a structure 152. The distance measured between the longitudinal central axes of the end members 144 and 146 is designated d, see FIG. 11. The structure 152 encloses a surface area 154. A wing 156 is secured to the structure 152 and extends over at least a portion of the surface area 154.

The propulsion device 10' further includes a pair of counterweight assemblies 158 and 160 secured to each of the pair of wing assemblies 140 and 142. Each wing assembly 140 and 142 is secured to a connecting rod 176. Opposite ends of the connecting rod 176 are attached to arms 162 and 164. Each of the arms 162 and 164 has a first end 166 with a weight 170 secured to it, and a second end 168 which is attached to the connecting rod 176. Each of the second ends 168, 168 is rotatably secured to one of the pair of side members 148 and 150. Each of the pair of arms 162 and 164 has an aperture 178 located between the first and second ends, 166 and 168 respectively, which is rotatably attached to one of the pair of support arms 30 and 32. The distance between the second end 168 of each of the arms 162 and 164 and the aperture 178 is designated $d_1$, see FIG. 12. The pair of arms 162 and 164 is rotatably connected by a pair of connecting shafts 180, 180 to the center of a pair of first pulleys 202, 202. The pair of connecting shafts 180, 180 is also connected to the pair of support arms 30 and 32. Each of the wing assemblies 140 and 142 includes a pair of first pulleys 202, 202. By "pulley" it is meant a simple machine consisting essentially of a wheel with a grooved rim in which a pulled rope, belt or chain can run to change the direction of the pull and thereby lift a load. Desirably, each of the first pulleys 202, 202 is a rather large pulley.

The distance measured between the longitudinal central axis of each of the connecting rods 176, 176 and the adjacent connecting shaft 180 is also equal to the distance $d_1$. It is important that this distance $d_1$ equal 0.25 of the distance d.

A timing belt 204, having a plurality of teeth formed on its inner surface (not shown), is used to connect the one of the pulleys 202 to a second pulley 206. The second pulley 206 is a fraction of the size of the first pulley 202. Desirably, the second pulley 206 has a diameter, which is less than half or 0.5 of the diameter of the first pulley 202. More desirably, the second pulley 206 has a diameter, which is less than about 0.3 of the diameter of the first pulley 202. Even more desirably, the second pulley 206 has a diameter, which is less than about 0.25 of the diameter of the first pulley 202. Most desirably, the second pulley 206 has a diameter, which is less than about 0.1 of the diameter of the first pulley 202. The timing belt 204 is a closed loop of a predetermined length.

The four gears 210 formed on the wing assembly 140 will mesh with the four gears 210 formed on the other wing assembly 142 when the wing assemblies 140 and 142 are aligned parallel to one another. As the end members 144, 144 of the two wing assemblies 140 and 142 separate from one another, the meshing gears 210 will separate as well. However, the two gears associated with each of the end members 146, 146 of each of the two wing assemblies 140 and 142 will still be in engagement. This means that these four gears 210, 210, 210 and 210 will be meshing together and they will enable the two wing assemblies 140 and 142 to remain synchronized during their linear movement.

Each of the first and second motors 74 and 76 includes two rotatable output shafts 58 and 60. The output shafts 58 and 60 are coaxially aligned opposite to one another. For each of the pair of wing assemblies 140 and 142, the output shaft 58 is secured one of the second pulleys 206 and the other output shaft 60 is secured to the other second pulley 206.

The propulsion device 10' further includes a gear 208 mounted on the rotatable output shaft 60. The gear 208 is located between one of the first and second motors 74 and 76 and one of the second pulleys 206. The outer periphery of each of the two gears 208, 208 contains a plurality of gear teeth. The gear teeth formed on the two gears 208, 208 mesh together to insure that the two wing assemblies 140 and 142 synchronously rotate.

It should be understood that one can replace the two motors 74 and 76, with a single motor, if desired. However, the use of a pair of motors 74 and 76 will eliminate most torque issues that may be present.

Still referring to FIG. 22, one wing assembly 140 will rotate clockwise while the other wing assembly 142 rotates counterclockwise. To insure that the two wing assemblies 140 and 142 stay synchronized, a pair of gears 210, 210 is secured to each of the end members 144 and 146. Each gear 210 is positioned inward of each of the side members 148 and 150. There are a total of four gears 210, 210, 210 and 210 for each of the wing assemblies 140 and 142.

The propulsion device 10' further includes a pair of locking devices 212, 212 secured to each end of the pair of end members 144 and 146 on each of the pair of wing assemblies 140 and 142. There are a total of four locking devices 212, 212, 212 and 212. Each pair of the locking devices 212, 212 is positioned outboard of the pair of side members 148 and 150. The locking devices 212, 212, 212 and 212 temporarily engage the first mechanism 34 and are capable of being moved linearly such that as two pairs of said locking devices 212, 212, 212 and 212 disengage from the first mechanism 34 each of the pair of wing assemblies 140 and 142 will be free to rotate relative to its counterweight assembly 160, 160. After each of the pair of wing assemblies 140 and 142 rotates through a set number of degrees, the two pairs of the locking devices 212, 212, 212 and 212 will again engage and the first mechanism 34 and a continuation of such action by the pair of wing assemblies will generate lift.

One will notice that the wing assembly 140 includes four lock devices 212, 212, 212 and 212, two of the lock devices 212, 212 are secured to the end member 144 and two of the lock devices 212, 212 are secured to the end member 146. Each of the lock devices 212, 212, 212 and 212 is positioned to the outside of the pair of side members 148 and 150. The other wing assembly 142 includes four hook devices 214, 214, 214 and 214. Each of the hook devices 214 is designed to engage with and then disengage from one of the locking devices 212. The interaction between both will be explained shortly. Two of the hook devices 214, 214 are secured to the end member 144 and two of the hook devices 214, 214 are secured to the end member 146. Each of the hook devices 214, 214, 214 and 214 is positioned to the outside of the pair of side members 148 and 150 of the wing assembly 142.

Referring to FIGS. 23-25 and 31, the lock device 212 includes a hub 213 and a mating hook device 214. The hub 213 can vary in dimensions. The hub 213 is depicted as a hollow circular member having an external diameter $d_2$ of about 0.5 inches. The hub 213 has a thickness to which can vary in dimension. The hub 213 has a central aperture 216 formed therethrough. Four (4) lock devices 212, 212, 212 and 212 are utilized in the propulsion device 10. FIG. 24 shows the internal structure of the hub 213. The hub 213 has an outer ring 218 which has a pair of slots 220, 220 formed therein. The pair of slots 220, 220 is located 180 degrees apart from one another. The pair of slots 220, 220 is dissected by an elongated groove 222, see FIG. 23. The elongated groove 222 is located halfway between a top surface 224 and a bottom surface 226. The location where the elongated groove 222 intersects each of the pair of slots 220, 220, a cross 228 is formed. Each hub 213 has a hollow circular interior chamber 230. The hub 213 has an internal diameter $d_3$ which can vary in dimension.

The central aperture 216 of the hub 213 is sized and configured to mate with one of the end members 144 or 146. Desirably, each of the end members 144 and 146 is an elongated shaft having identical outer diameters.

Referring to FIG. 26, a first magnet 232 and a second magnet 233 is shown. Each of the first and second magnets, 232 and 233 respectively, has a central aperture 234 and a flat peripheral portion 236. Four of the first magnets 232, 232, 232 and 232 are secured to the wing assembly 140. Four of the second magnets 233, 233, 233 and 233 are secured to the wing assembly 142. Each of the first magnets 232, 232, 232 and 232 is positioned on the outside of each of the four lock devices 212, 212, 212 and 212, see FIG. 22. As the first and second magnets, 232 and 233 respectively, rotate, they will cause the corresponding hook device 214 to engage with the hub 213 and remain engage. When the flat portions 236, 236 of the first and second magnets 232 and 233 align with one another, the magnetic force is dissipated and the hook device 214 will separate from the hub 213. When this occurs, the wing assemblies 140 and 142 will be free to rotate about their connecting rods 176, 176.

Referring to FIGS. 27 and 28, the other components of the hook device 214 will now be explained. The hook 238 has a first end 240 and a second end 242. The first end 240 has a concave shape and the second end 242 has a semi-circular shape. An aperture 244 is formed through the hook 238 adjacent to the second end 242. The hook 238 also has a rib 246, which extends both upward and downward from the hook device 214. The rib 246 is sized to span the distance between the aperture 216 formed in the locking device 212, and the internal wall of the ring 218. Four of the magnets 232 are secured to the wing assembly 140 and four of the magnets 232 are secured to the wing assembly 142.

Figure 29:
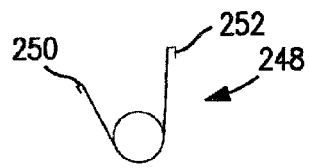
FIG. 29 is a front view of a spring.

Referring to FIG. 29, a spring 248 is shown having a first hooked end 250 and a second hooked end 252. Four springs 248, 248, 248 and 248 are attached to the wing assembly 142 adjacent to each of the four hooks 238, 238, 238 and 238.

Figure 30:
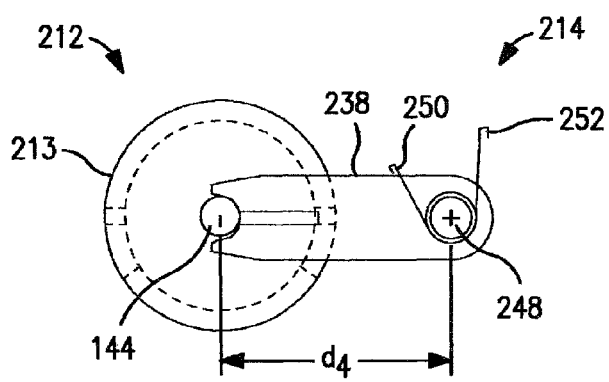
FIG. 30 is a front view of the hook shown in FIG. 27 engaging with the locking device shown in FIG. 23.

Referring to FIGS. 22 and 30, one of the hooks 238 is shown inserted into one of the locking devices 212. The hook 238 passes through one of the slots 220 and the elongated groove 222 such that the concave first end 240 of the hook 238 contacts one of the end members 144 or 146 which passes through the aperture 216. The aperture 244 formed on the hook 238 is coaxially aligned and mounted on either the top end member 144 or on the bottom end member 146 of the wing assembly 142. In FIG. 22, two of the hooks 238, 238 are mounted on the top end member 144 and two of the hooks 238, 238 are mounted on the bottom end member 146. FIG. 30 also has the distance between the center of the locking device 212 and the center of the aperture 244, formed in the hook 238, designated as $d_4$. The distance $d_4$ must equal the internal diameter $d_3$ of the locking device 212, see FIG. 24.

Figure 31:
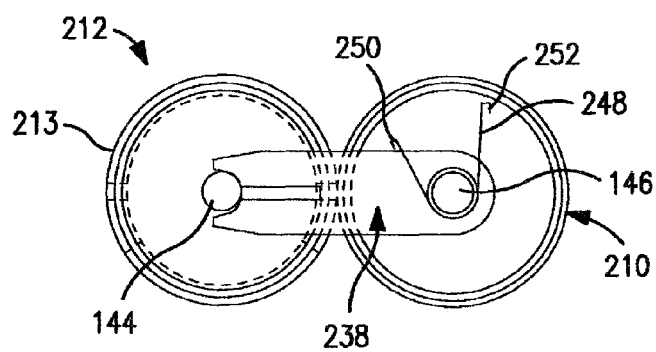
FIG. 31 is a front view of the view hook, locking device and adjacent gear.

Referring to FIG. 31, the first hooked end 250 of each of the four springs 248, 248, 248 and 248 is attached to one of the hooks 238, 238, 238 and 238. The second hooked end 252 of each of the four springs 248, 248, 248 and 248 is attached to one of the four gears 210, 210, 210 and 210. The first and second magnets 232 and 233 are part of each of the locking devices 212. Each of the first magnets 232, of which there are four, is positioned to the outside of each of the hubs 213, of which there are four. Each of the second magnets 233, of which there are four, is positioned to the outside of each of the hook devices 214, of which there are four. The springs 248, of which there are four, is positioned on the opposite side of each of the hook devices 214 and the second hooked end 252 of each spring 248 is attached to the adjacent gear 210.

It should be understood that a pair of the hook devices 214, 214 will always be engaged with a pair of the locking devices 212, 212 as the pair of wings 156, 156 rotate. Over a portion of the wing cycle, all four of the hook devices 214, 214, 214 and 214 will be engaged with all four locking devices 212, 212, 212 and 212. This occurs when the wings 156, 156 are aligned parallel to one another.

Furthermore, in FIG. 22, the distance between the central axes of the two connecting shafts 180, 180 is equal to $2d_1 + d_3$.

Figure 32:
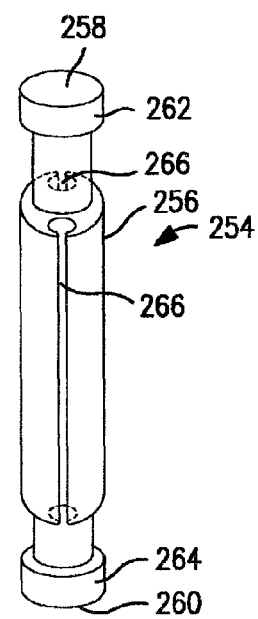
FIG. 32 is a perspective view having a partial cutaway showing a stationary cylindrical member.
Figure 33:
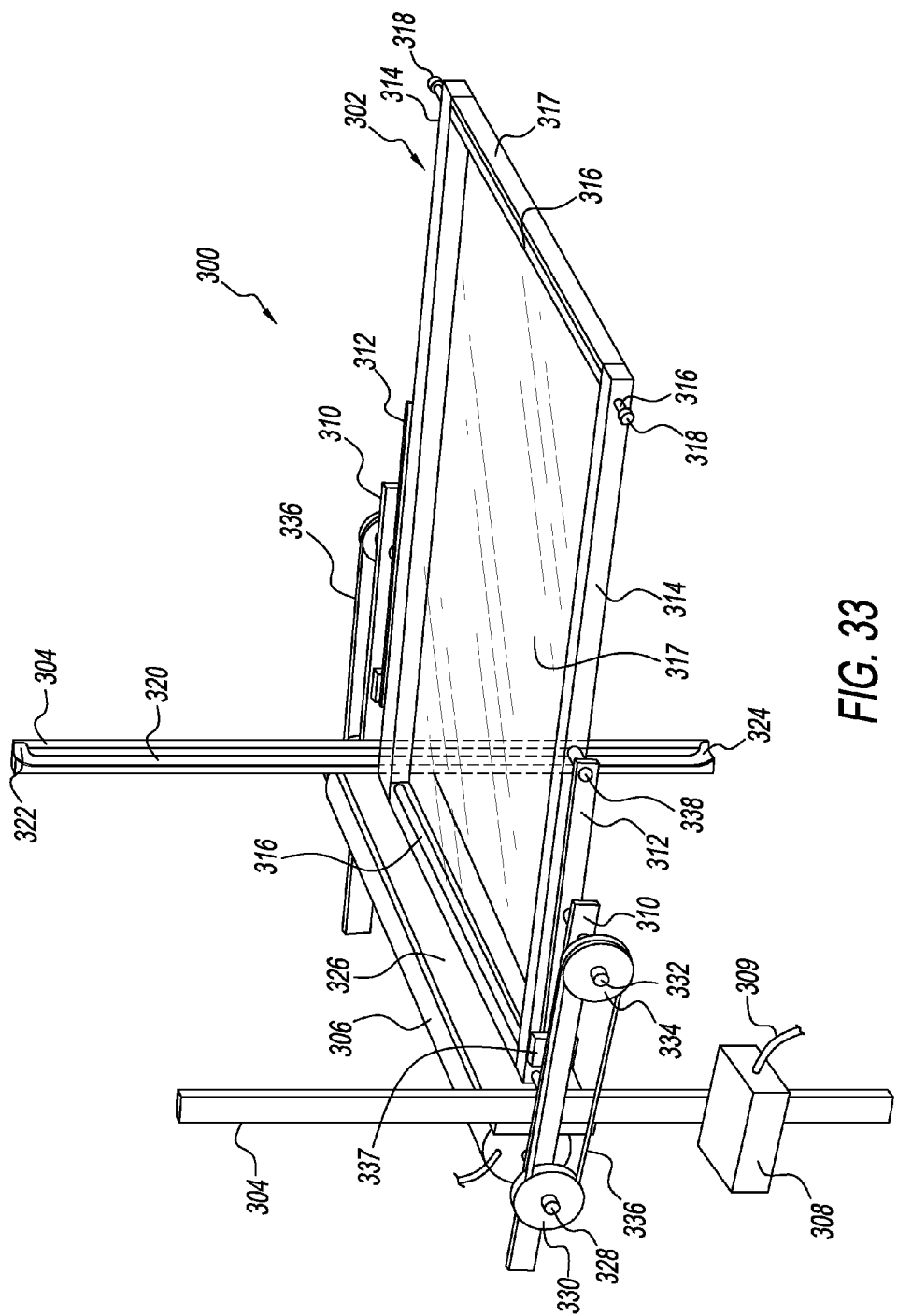
FIG. 33 is a perspective view of a second embodiment of a propulsion device.
Figure 34:
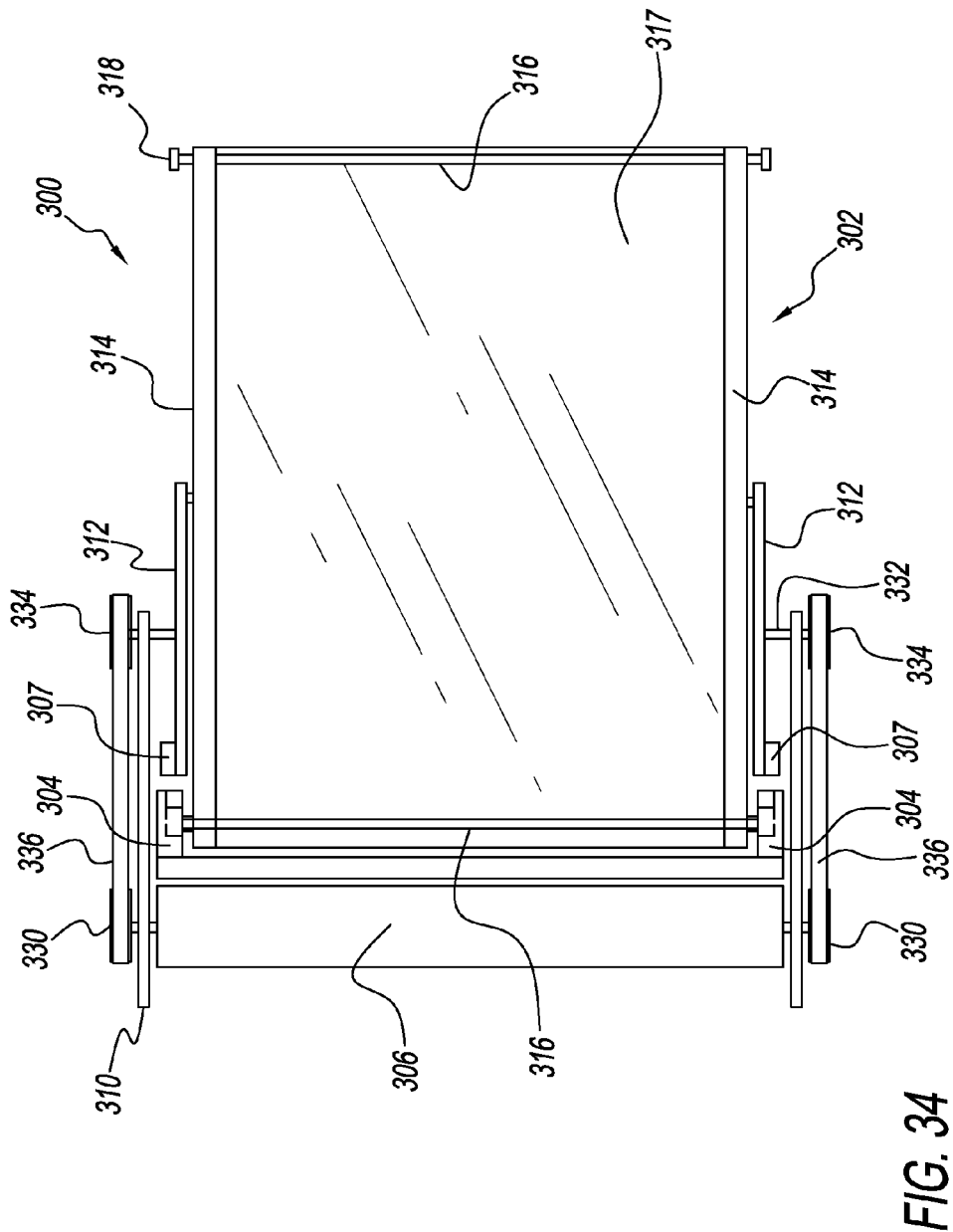
FIG. 34 is a top view of a second embodiment of a propulsion device.
Figure 35:
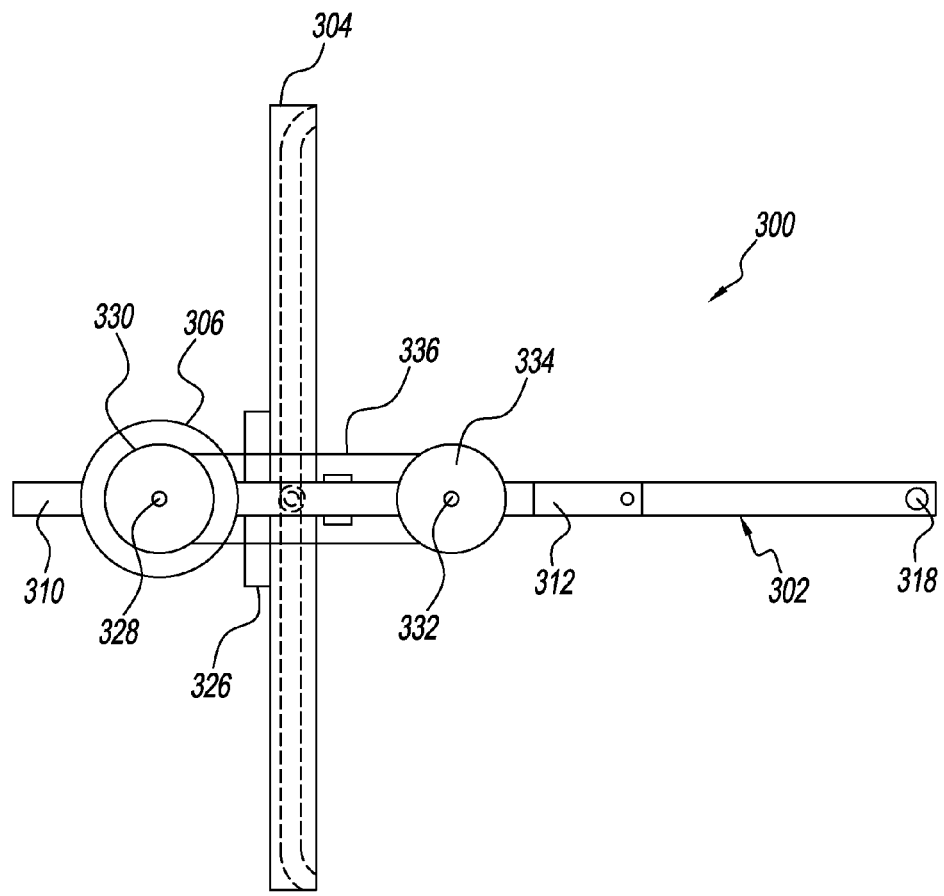
FIG. 35 is a side view of a second embodiment of a propulsion device with a wing in a horizontal position.

Referring to FIG. 32, an elongated, cylindrical member 254 is shown having a cylindrical portion 256 positioned between a first or top surface 258, and a second or bottom surface 260. An abutment 262 can be formed at or slightly below the first surface 258 and an abutment 264 can be formed at or slightly above the second surface 260. The cylindrical member 254 is a stationary member and does not rotate. The cylindrical member 254 has a pair of linear grooves 266, 266 formed therein. Each of the pair of grooves 266, 266 extend through the length of the cylindrical portion 256. The pair of grooves 266, 266 is aligned opposite to one another. In other words, the pair of grooves 266, 266 is spaced 180 degrees from one another. Each of the pair of grooves 266, 266 is sized and configured to receive a spherical ball 198 formed on the locking device 184, see FIGS. 15-17. A pair of the cylindrical members 254, 254 could be used in FIG. 22. The pair of cylindrical members 254, 254 would function similar to the pair of worms 36 and 38 to provide linear travel to four locking devices 184, 184, 184 and 184 engaged in the pair of grooves 266, 266. Two pairs of locking devices 184, 184, 184 and 184 can engage with each of the cylindrical members 254, 254 in a similar fashion as that shown in FIG. 20. Each pair of locking devices 184, 184 will be aligned horizontally parallel to one another and can travel linearly upward through the pair of grooves 266, 266. Each pair of locking devices 184, 184 is vertically spaced apart from the second pair of locking devices 184, 184, as is shown in FIG. 20. A total of eight locking devices 184 will be used and each of the locking devices 184 will be connected to an end member 144 or 146 as was explained with reference to FIG. 20. A pair of the spaced apart cylindrical members 254, 254 along with four pairs of the locking devices 184 can be substituted into the arrangement shown in FIG. 22 to provide linear travel for the locking devices 184.

The two stationary members 254, 254 will be substituted for the pair of rotatable worms 36 and 38, see FIG. 4. The eight locking devices 184 will engage with the two stationary members 254, 254 as explained above. When this occurs, the four locking devices 212 and the four hook devices 214 can be eliminated from FIG. 22.

Referring again to FIG. 22, the two wing assemblies 140 and 142 start out in an initial position aligned side by side and parallel to one another. The top end member 144 of each wing assembly 140 and 142 is at 0 degrees. The hooks 238, 238 are disengaged from the locking devices 212, 212 on the top end member 144 and the hooks 238, 238 are engaged with the locking devices 212, 212 on the bottom end member 146 of the two wing assemblies 140 and 142. The wing assembly 140 is then rotated on its connecting rod 176 by the motor 74 via the arms 162 and 164 in a counter clockwise direction, and the wing assembly 142 is rotated on its connecting rod 176 by the motor 76 via the arms 162 and 164 in a clockwise direction. The two wing assemblies 140 and 142 are simultaneously rotated through 90 degrees and then through 180 degrees. At 180 degrees, the hooks 238, 238 disengage from the locking devices 212, 212 on the bottom end member 146 and the hooks 238, 238 engage the locking devices 212, 212 on the top end member 144 of the wing assemblies 140 and 142. The wing assemblies 140 and 142 then continue to rotate through 270 degrees and then to 360 degrees, back to their original positions. At this point, the hooks 238, 238 are disengaged from the locking devices 212, 212 on the top end members 144, 144 and the hooks 238, 238 are re-engaged with the locking devices 212, 212 on the bottom end members 146, 146 of the wing assemblies 140 and 142. This alternating pattern continues for each cycle of the wing assemblies 140 and 142. At the same time, the connecting rods 176, 176 of the two wing assemblies 140 and 142 will move vertically up and down and horizontally left and right to form a unique rotational path.

This propulsion device 10 or 10' can be constructed into a backpack unit, which can be secured to the back of a person 12 to serve as a self propulsion device. The propulsion device 10 or 10' can include a hand held throttle to control the motors 74 and 76. By increasing the speed of the motors 74 and 76, one can create lift and move vertically upward. By decreasing speed, one can decrease lift and descend back to the ground. The person 12 wearing the propulsion device 10 or 10' can also move his or her upper torso forward and backward, or right and left. The person 12 can do this by bending forward or backward at the waist or by leaning his or her torso to the right or to the left. As the person shifts his or her center of gravity, movement in a given direction can be obtained. By doing so, the angle of the wing assemblies 140 and 142 will change and movement in those directions can be accomplished. For example, when the person 12 leans his or her torso and head forward, he or she will move forward.

Alternatively, the propulsion device 10 or 10' can be employed in a toy aircraft, such as a helicopter, which can be remotely controlled by a person standing on the ground. In addition, the propulsion device 10 or 10' can be incorporated in commercial or military aircraft.

With reference to FIGS. 33-38, a second embodiment of the propulsion device 300 includes a wing 302, a pair of sliding rails 304, an electric motor 306, an electrical power source 308, a pair of connecting rod supports 310 and a pair of connecting rods 312. Each wing 302 includes two lengthwise members 314, two cross rods 316, an outer layer 317 and four roller bearings 318. One end of the two cross rods 316 are pressed into each end of one of the two lengthwise members 314, such that the one end of the two cross rods 316 extends past the an outer surface of the lengthwise member 314. The other end of the two cross rods 316 are pressed into each end of the other one of the two lengthwise members 314, such that the other end of the cross rods 316 extends past the outer surface of the lengthwise member 314. Each end of the two cross rods 316 is terminated with the four roller bearings 318. The outer layer 317 is secured around a top and bottom of the two lengthwise members 314 and the two cross rods 316.

Each sliding rail 304 includes a lengthwise track 320 formed on an inner surface thereof. A track entrance 322 and a track exit 324 of the lengthwise track 320 are curved to receive the four roller bearings 318. The roller bearings 318 reduce friction between the cross rod 316 and the lengthwise track 320, the track entrance 322 and the track exit 324. The following formula describing the preferable motion of an outer edge of the wing 302 in the sliding rail 304 is given by way of example and not by way of limitation. The preferable formula is $(4-0.25X^2)^{0.5}+(X-0.25X^2)^{0.5}$, where "X" is an imaginary line perpendicular to the lengthwise track 320 and "^" is raised to the power of.

Each end of a cross plate 326 is attached to one of the pair of sliding rails 304. The electric motor 306 is attached to the cross plate 326. The electrical power source 308 is connected to the electric motor 306 with at least one electrical wire 309. The electrical power source 308 is preferably secured to one of the pair of sliding rails 304. The electric motor 306 preferably includes a pair of opposing drive shafts 328. However, two electric motors with a single drive shaft may replace the electric motor 306. A drive pulley 330 is secured to each drive shaft 328. One end of connecting rod support 310 is attached to one of the pair of sliding rails 304. A rotating drive pin 332 is retained in the other end of the connecting rod support 310. A driven pulley 334 is secured to one end of the rotating drive pin 332. A drive belt 336 is attached to the drive pulley 330 and the driven pulley 334. The other end of the rotating drive pin 332 is pressed into a middle of the connecting rod 312. A counter weight 337 is attached to one end of the connecting rod 312 and a wing pivot pin 338 extends inward from the other end of the connecting rod 312. The wing pivot pin 338 is rotatably retained in a middle of the lengthwise member 314.

Figure 39:
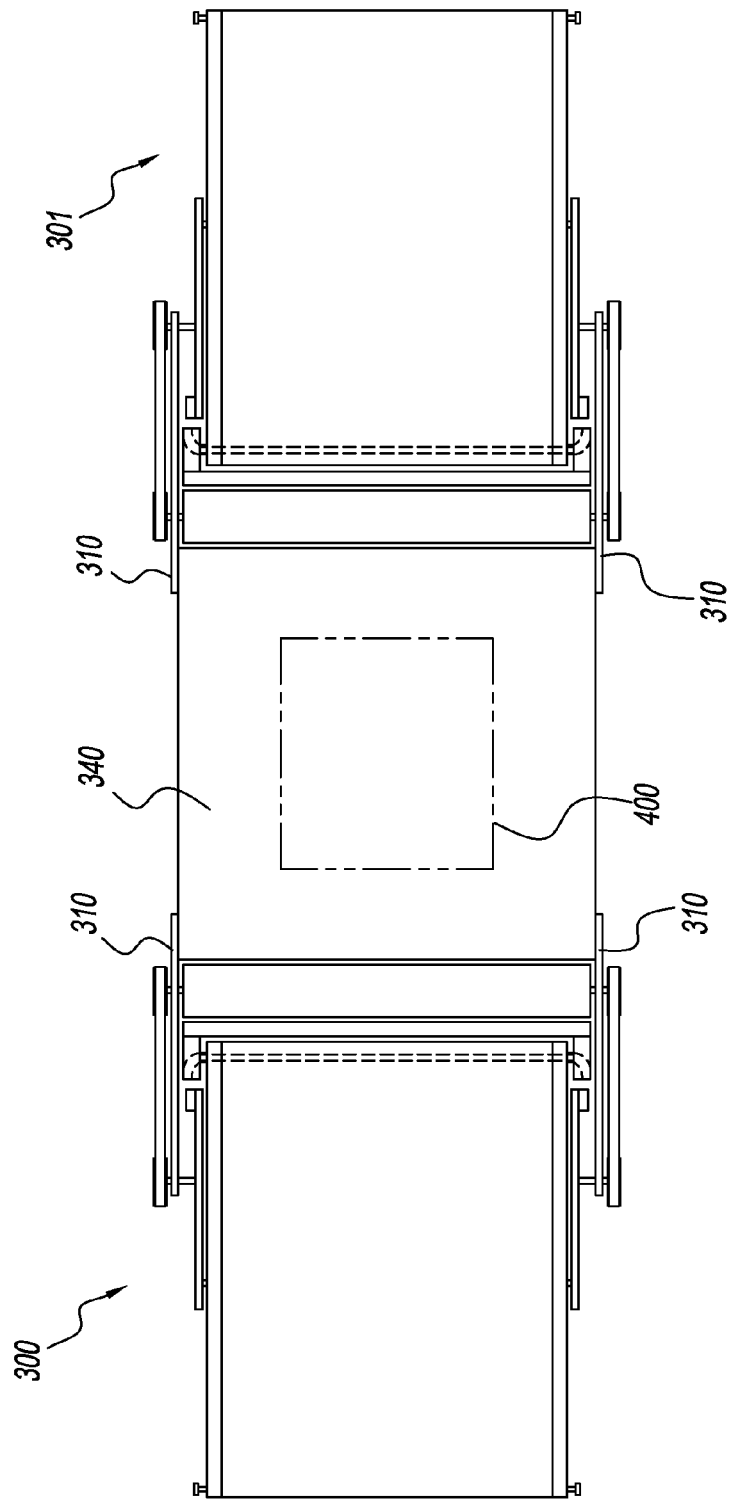
FIG. 39 is a top view of an object platform supported by two second embodiment propulsion devices.

It is preferable for the pair of connecting rod supports 310 to extend behind the electric motor 306. With reference to FIG. 39, a first end of an object platform 340 is secured to the pair of connecting rod supports 310 of the first propulsion device 300 and a second end of the object platform 340 is secured to the pair of connecting rod supports 310 of a second propulsion device 301. An item 400 is retained on the object platform 340.

Figure 36:
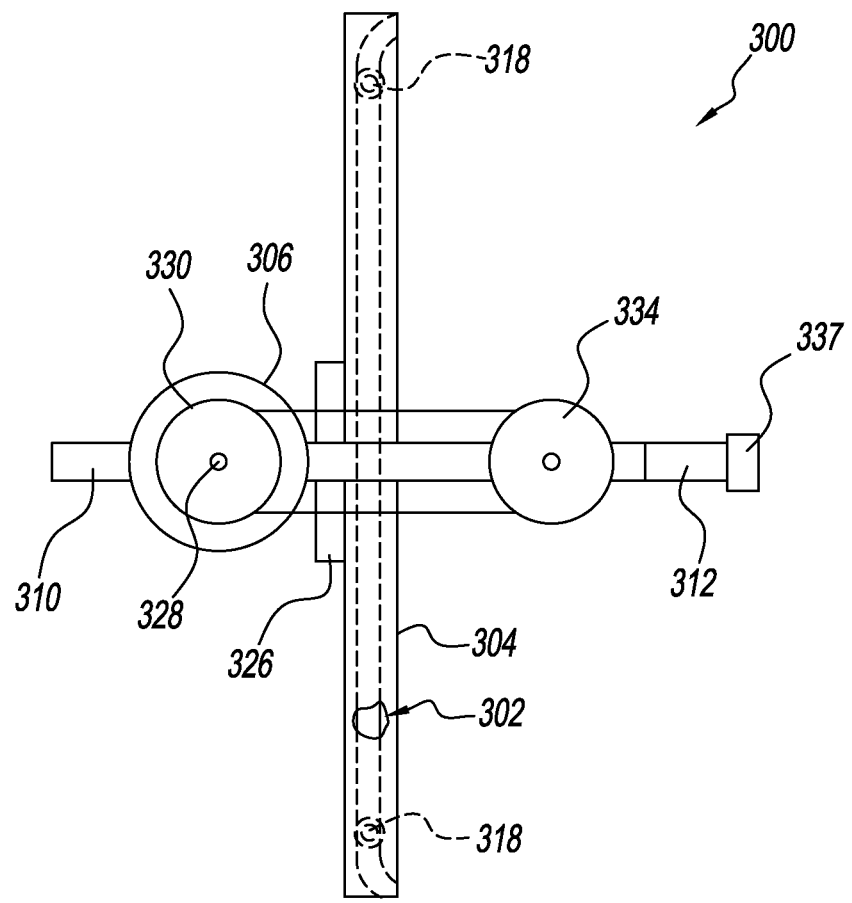
FIG. 36 is a side view of a second embodiment of a propulsion device with a wing in a vertical position.
Figure 37:
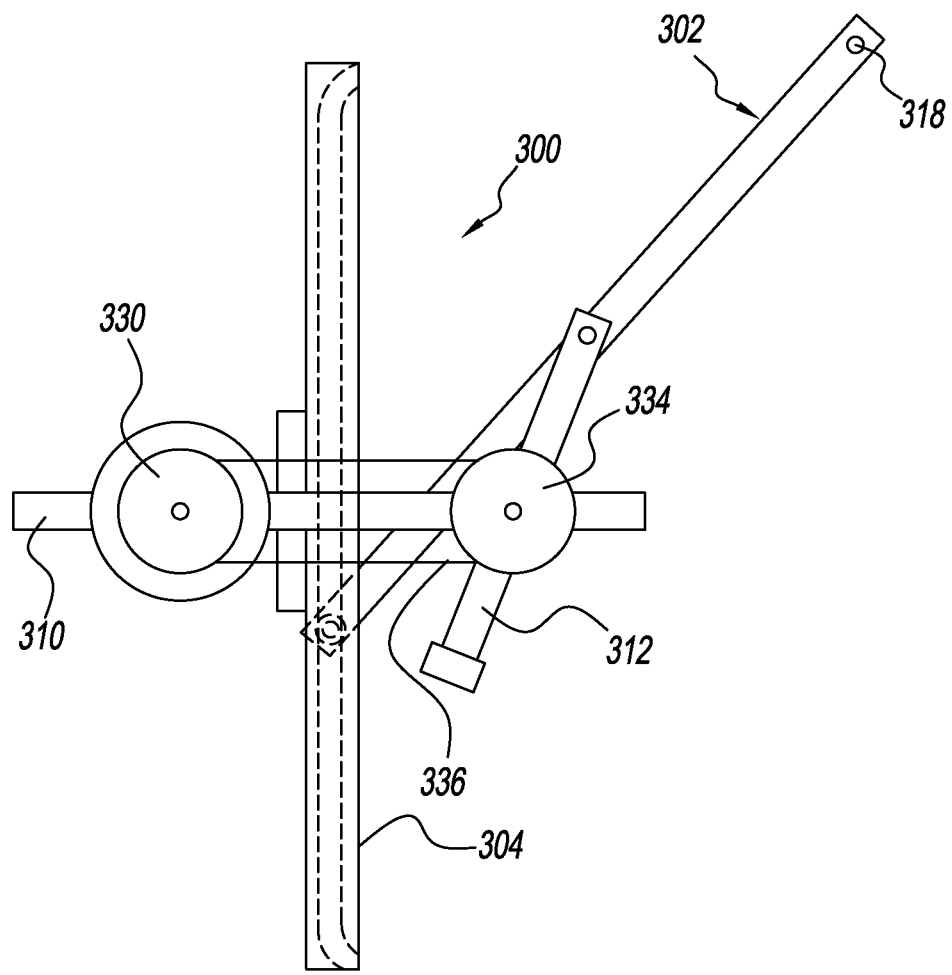
FIG. 37 is a side view of a second embodiment of a propulsion device with a wing in a first angled position.
Figure 38:
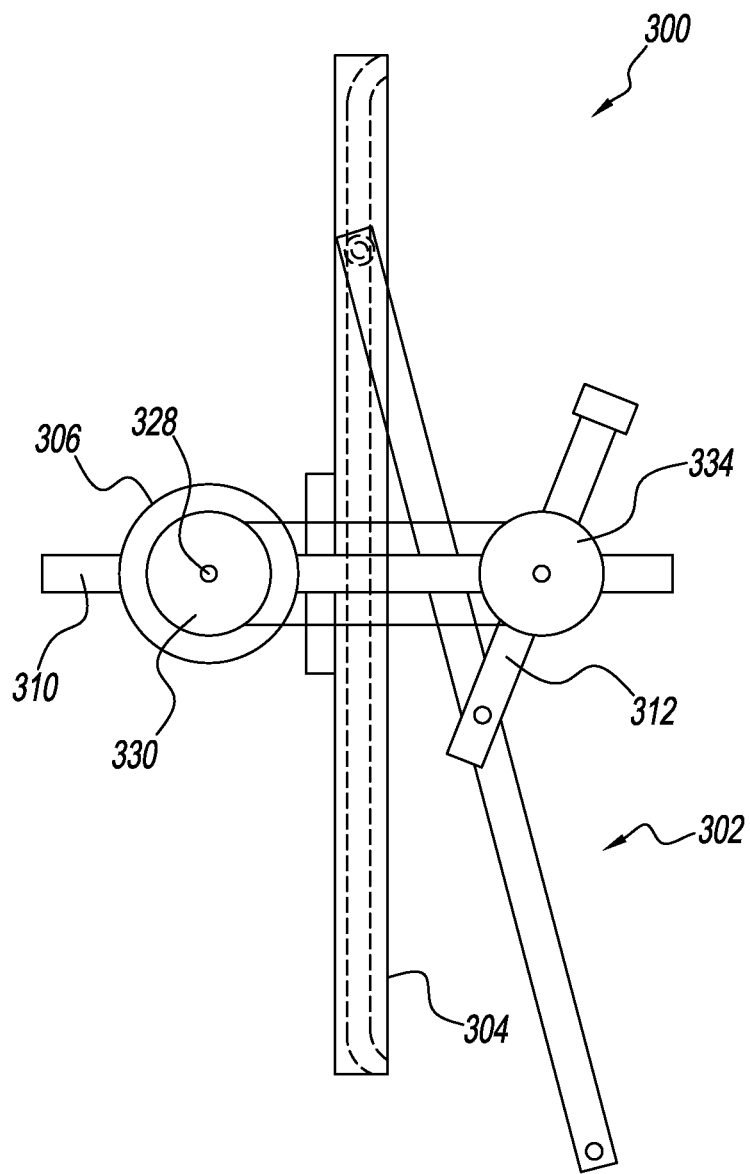
FIG. 38 is a side view of a second embodiment of a propulsion device with a wing in a second angled position.

In use, the wing 302 may start in any angular position. At least two of the four roller bearings 318 are always engaged in the lengthwise track 320 of the pair of sliding rails 304. With reference to FIG. 36, all four roller bearings 318 are engaged with the pair of sliding rails 304, when the wing 302 is in a vertical position. Rotation of the pair of connecting rods 312 causes the wing 302 to rotate in a substantially elliptical orbit. The motion of the two wings 302 will provide sufficient lift to elevate the item 400 secured to the object platform 340 and transport thereof from one location to another location.

The propulsion device 300 may also be used to blow air, create a vacuum or push water. Thus the propulsion device may be used in as a fan in a leaf blower; as a pumping mechanism; as a propulsion device to propel a boat; or for any other suitable purpose.

While the invention has been described in conjunction with two specific embodiments, it is to be understood that many alternatives, modifications and variations will be apparent to those skilled in the art in light of the foregoing description. Accordingly, this invention is intended to embrace all such alternatives, modifications and variations, which fall within the spirit and scope of the appended claims.

I claim:

1. A propulsion device comprising:
a pair of sliding rails including a pair of lengthwise tracks;
a wing including a pair of lengthwise members, a pair of cross rods and an outer layer, said pair of cross rods retained in each end of said pair of lengthwise members, said outer layer wrapped around at least said pair of cross rods, wherein at least one of said pair of cross rods engages said pair of lengthwise tracks during rotation of said wing; and
a pair of connecting rods having a middle rotated by a driving means, one end of said pair of connecting rods rotatably connected to a middle of said pair of lengthwise members.

2. The propulsion device of claim 1, further comprising:
a counterweight attached to the other end of each one of said pair of connecting rods.

3. The propulsion device of claim 1, further comprising:
a roller bearing attached to each end of said pair of cross rods.

4. The propulsion device of claim 1, further comprising:
a drive pulley attached to a drive shaft of said driving means.

5. The propulsion device of claim 4, further comprising:
a driven pulley attached to said middle of one of said pair of connecting rods, and a drive belt retained on said drive pulley and said driven pulley.

6. The propulsion device of claim 1 wherein:
each one of said pair of lengthwise tracks includes a track entrance and a track exit, said track entrance and said track exit are curved to receive an end of said pair of cross rods.

7. A propulsion device comprising:
a pair of sliding rails includes a pair of lengthwise tracks;
a wing includes a pair of lengthwise members, a pair of cross rods and an outer layer, said pair of cross rods retained in each end of said pair of lengthwise members, said outer layer wrapped around at least said pair of cross rods, wherein at least one of said pair of cross rods engages said pair of lengthwise tracks during rotation of said wing; and
a pair of connecting rods having a middle rotated by at least one electric motor, one end of said pair of connecting rods rotatably connected to a middle of said pair of lengthwise members.

8. The propulsion device of claim 7, further comprising:
a counterweight attached to the other end of each one of said pair of connecting rods.

9. The propulsion device of claim 7, further comprising:
a roller bearing attached to each end of said pair of cross rods.

10. The propulsion device of claim 7, further comprising:
a drive pulley attached to a drive shaft of said at least one motor.

11. The propulsion device of claim 10, further comprising:
a driven pulley attached to said middle of one of said pair of connecting rods, and a drive belt retained on said drive pulley and said driven pulley.

12. The propulsion device of claim 7 wherein:
each one of said pair of lengthwise tracks includes a track entrance and a track exit, said track entrance and said track exit are curved to receive an end of said pair of cross rods.

13. A propulsion device comprising:
a pair of sliding rails includes a pair of lengthwise tracks;
a cross plate having one end attached to one of said pair of sliding rails and the other end attached to the other one of said pair of sliding rails;
a wing includes a pair of lengthwise members, a pair of cross rods and an outer layer, said pair of cross rods retained in each end of said pair of lengthwise members, said outer layer wrapped around at least said pair of cross rods, wherein at least one of said pair of cross rods engage said pair of lengthwise tracks during rotation of said wing;
a pair of connecting rods having a middle rotated by at least one electric motor, one end of said pair of connecting rods rotatably connected to a middle of said pair of lengthwise members; and
a pair of connecting rod supports attached to said pair of sliding rails, said pair of connecting rod supports rotatably retain said pair of connecting rods.

14. The propulsion device of claim 13, further comprising:
a counterweight attached to the other end of each one of said pair of connecting rods.

15. The propulsion device of claim 13, further comprising:
a roller bearing attached to each end of said pair of cross rods.

16. The propulsion device of claim 13, further comprising:
a drive pulley attached to a drive shaft of said at least one motor.

17. The propulsion device of claim 16, further comprising:
a driven pulley attached to said middle of one of said pair of connecting rods, and a drive belt retained on said drive pulley and said driven pulley.

18. The propulsion device of claim 13 wherein:
each one of said pair of lengthwise tracks includes a track entrance and a track exit, said track entrance and said track exit are curved to receive an end of said pair of cross rods.

* * * * *